(12) United States Patent
Alliss

(10) Patent No.: US 10,273,112 B2
(45) Date of Patent: *Apr. 30, 2019

(54) STRING TRIMMER HEAD WITH CURVED TRIMMER LINE GUIDE

(75) Inventor: George E. Alliss, Fairmont, NC (US)

(73) Assignee: Torvian Inc., Fallsington, PA (US)

( * ) Notice: Subject to any disclaimer, the term of this patent is extended or adjusted under 35 U.S.C. 154(b) by 1030 days.

This patent is subject to a terminal disclaimer.

(21) Appl. No.: 13/213,180

(22) Filed: Aug. 19, 2011

(65) Prior Publication Data

US 2011/0302793 A1 Dec. 15, 2011
US 2017/0183194 A9 Jun. 29, 2017

Related U.S. Application Data

(63) Continuation-in-part of application No. 11/985,673, filed on Nov. 16, 2007, now Pat. No. 8,025,249.

(60) Provisional application No. 60/859,246, filed on Nov. 16, 2006.

(51) Int. Cl.
*A01D 34/416* (2006.01)
*B65H 54/30* (2006.01)

(52) U.S. Cl.
CPC ......... *B65H 54/30* (2013.01); *A01D 34/4165* (2013.01); *A01D 34/4166* (2013.01)

(58) Field of Classification Search
CPC .............. A01D 34/4165; A01D 34/416; A01D 34/4166; A01D 34/4161; A01D 34/4162; A01D 34/4163
USPC ................................ 30/276, 376; 242/378.1
See application file for complete search history.

(56) References Cited

U.S. PATENT DOCUMENTS

| 2,429,675 | A | * | 10/1947 | Eypper | .................. | H02G 11/02 |
| | | | | | | 24/909 |
| 3,708,967 | A | | 1/1973 | Geist et al. | | |
| 3,826,068 | A | | 7/1974 | Ballas et al. | | |
| 4,054,992 | A | | 10/1977 | Ballas et al. | | |
| 4,097,991 | A | | 7/1978 | Proulx | | |
| 4,145,809 | A | | 3/1979 | Proulx | | |
| 4,172,322 | A | | 10/1979 | Ballas | | |
| 4,271,595 | A | | 6/1981 | Rahe | | |
| 4,302,878 | A | | 12/1981 | Bonforte | | |
| 4,458,419 | A | | 7/1984 | Proulx | | |
| 4,627,322 | A | | 12/1986 | Hayhurst, Jr. | | |
| 4,685,279 | A | | 8/1987 | Gullett | | |
| 4,726,176 | A | | 2/1988 | McGrew | | |
| 4,744,148 | A | | 5/1988 | Brown | | |

(Continued)

*Primary Examiner* — Jason Daniel Prone
*Assistant Examiner* — Samuel A Davies
(74) *Attorney, Agent, or Firm* — Sand, Sebolt & Wernow Co., LPA

(57) ABSTRACT

A trimmer head assembly for a trimming machine. The trimmer head assembly includes a spool. The spool has a central tubular hub. The spool also has a central flange that radially extends from the hub. A trim line conduit is joined to the central flange. The trim line conduit has a first open end. The first open end leads to a first straight section. The first straight section leads to a curved central section. The curved central section leads to a second straight section. The second straight section leads to a second open end. The curved central section passes around the center of the spool. A housing is provided that receives the spool therein. When loading trimmer line into the trimmer head assembly, the shape of the conduit enables the trimmer line to pass around the central opening in the spool without binding.

9 Claims, 19 Drawing Sheets

(56) References Cited

U.S. PATENT DOCUMENTS

| | | | |
|---|---|---|---|
| 4,756,146 A | 7/1988 | Rouse | |
| D299,484 S | 1/1989 | Lee | |
| 4,922,791 A | 5/1990 | Pinney | |
| 4,942,664 A | 7/1990 | Zatulovsky | |
| 5,023,998 A * | 6/1991 | Masciarella | A01D 34/4166 30/276 |
| 5,085,113 A | 2/1992 | Pinney | |
| 5,345,683 A | 9/1994 | Kanou | |
| 5,659,960 A | 8/1997 | Everts et al. | |
| 5,671,536 A | 9/1997 | Everts et al. | |
| 5,758,424 A | 6/1998 | Iacona et al. | |
| 5,765,287 A * | 6/1998 | Griffini | A01D 34/4163 242/125.1 |
| 5,806,192 A | 9/1998 | Everts et al. | |
| 5,852,876 A * | 12/1998 | Wang | A01D 34/733 30/276 |
| 5,887,348 A | 3/1999 | Iacona et al. | |
| 5,896,666 A | 4/1999 | Iacona et al. | |
| 5,901,448 A | 5/1999 | Lingerfelt | |
| 5,979,064 A | 11/1999 | Kitz et al. | |
| 6,035,618 A * | 3/2000 | Fogle | A01D 34/4166 30/276 |
| 6,052,907 A | 4/2000 | Wang | |
| 6,094,825 A * | 8/2000 | Hinson | A01D 34/4166 30/276 |
| 6,148,523 A * | 11/2000 | Everts et al. | 30/276 |
| 6,263,580 B1 | 7/2001 | Stark et al. | |
| 6,279,235 B1 | 8/2001 | White, III et al. | |
| 6,314,848 B2 * | 11/2001 | Morabit | A01D 34/4168 30/276 |
| 6,347,455 B2 | 2/2002 | Brant et al. | |
| 6,854,185 B1 | 2/2005 | Alliss | |
| 6,952,877 B2 | 10/2005 | Pfaltzgraff | |
| 7,640,668 B2 | 1/2010 | Iacona | |
| 2002/0189107 A1 | 12/2002 | Arnetoli | |
| 2004/0103543 A1* | 6/2004 | Fogle | A01D 34/416 30/276 |
| 2005/0217120 A1 | 10/2005 | Proulx | |
| 2005/0252009 A1 | 11/2005 | Alliss | |
| 2007/0130781 A1* | 6/2007 | Iacona | A01D 34/4163 30/276 |
| 2008/0053052 A1 | 3/2008 | Cigarini | |

* cited by examiner

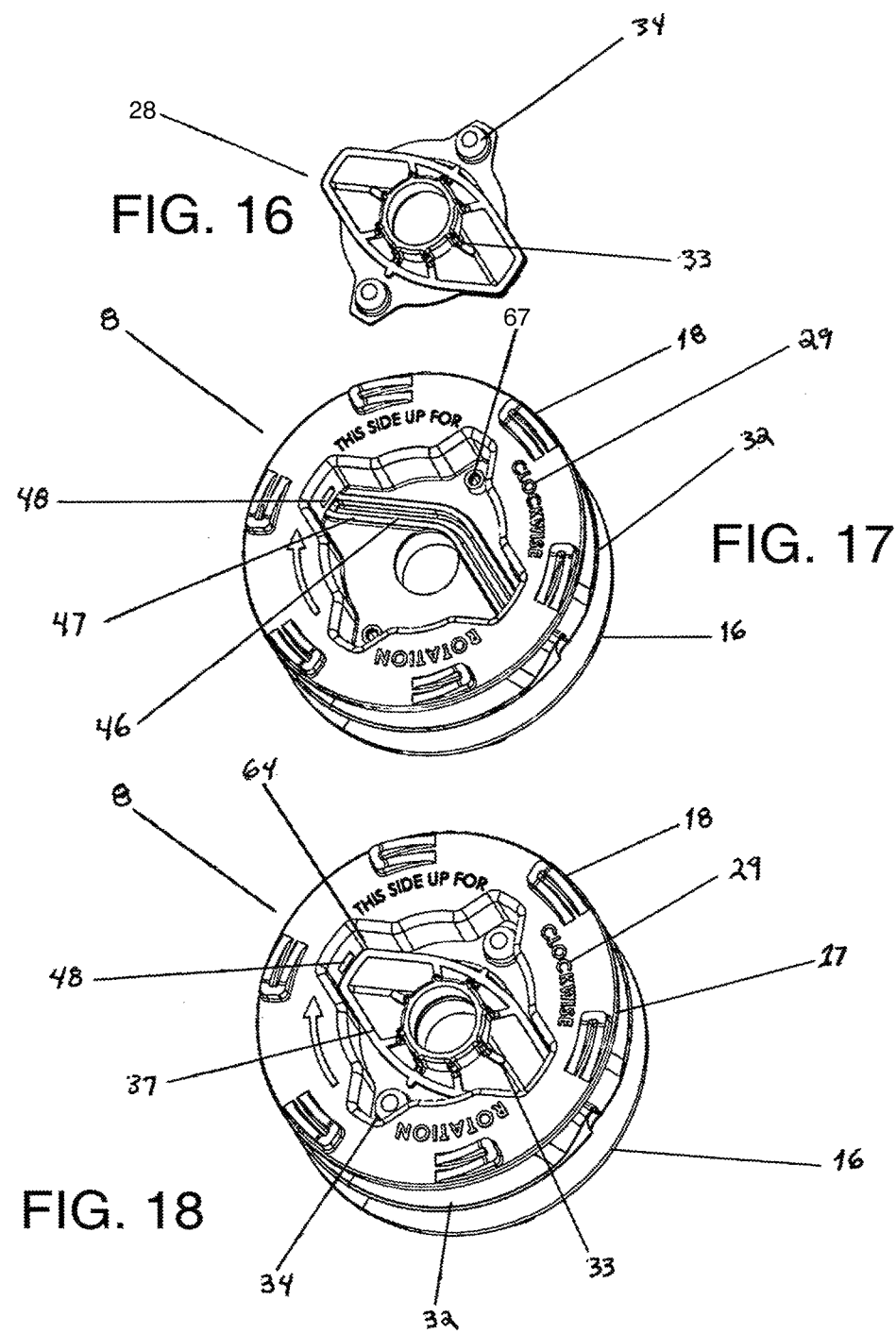

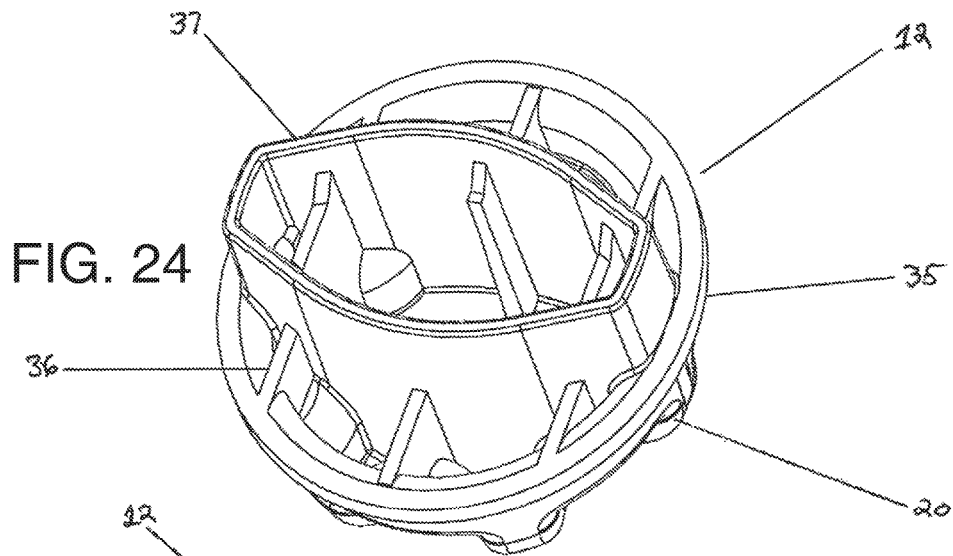
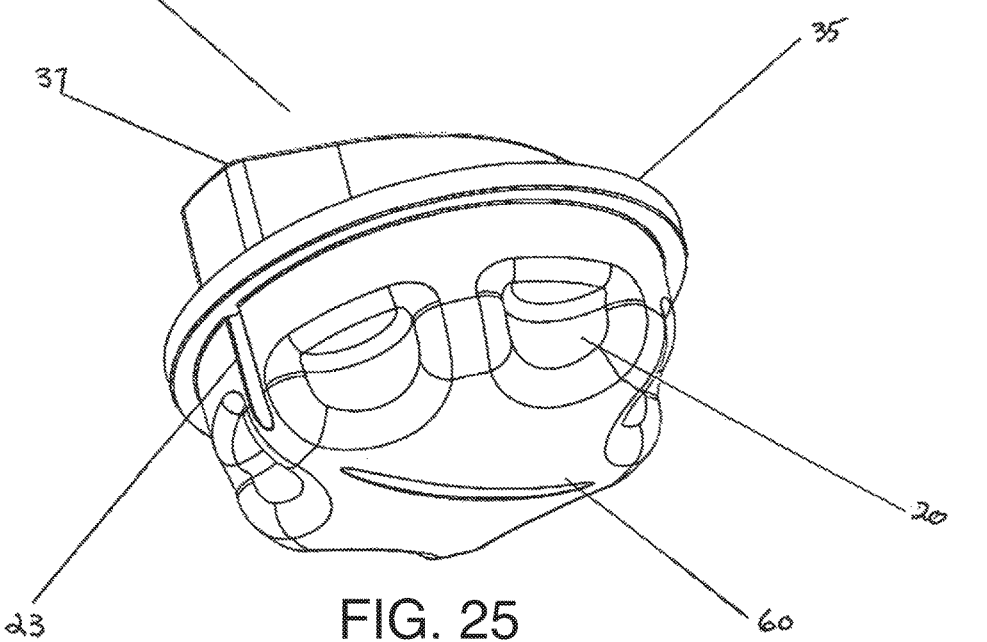

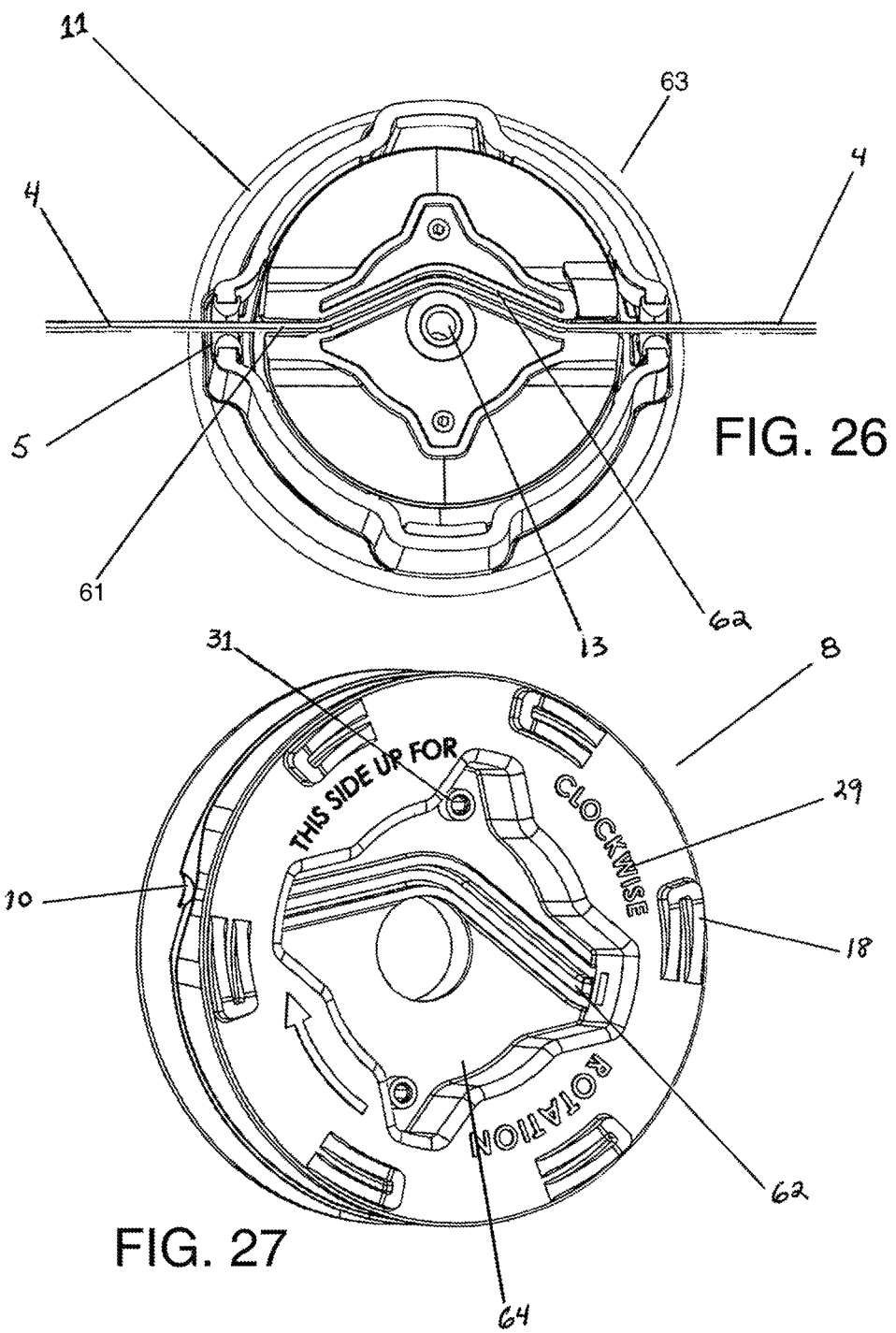

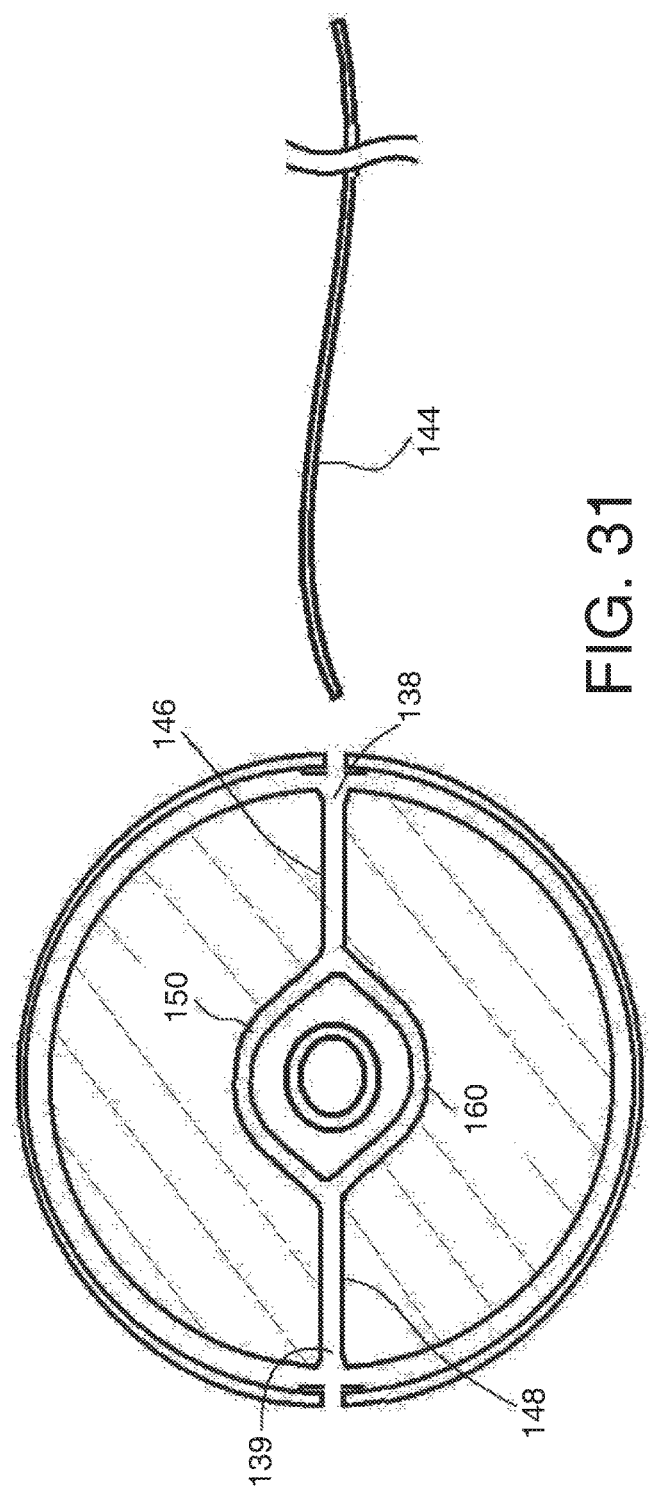

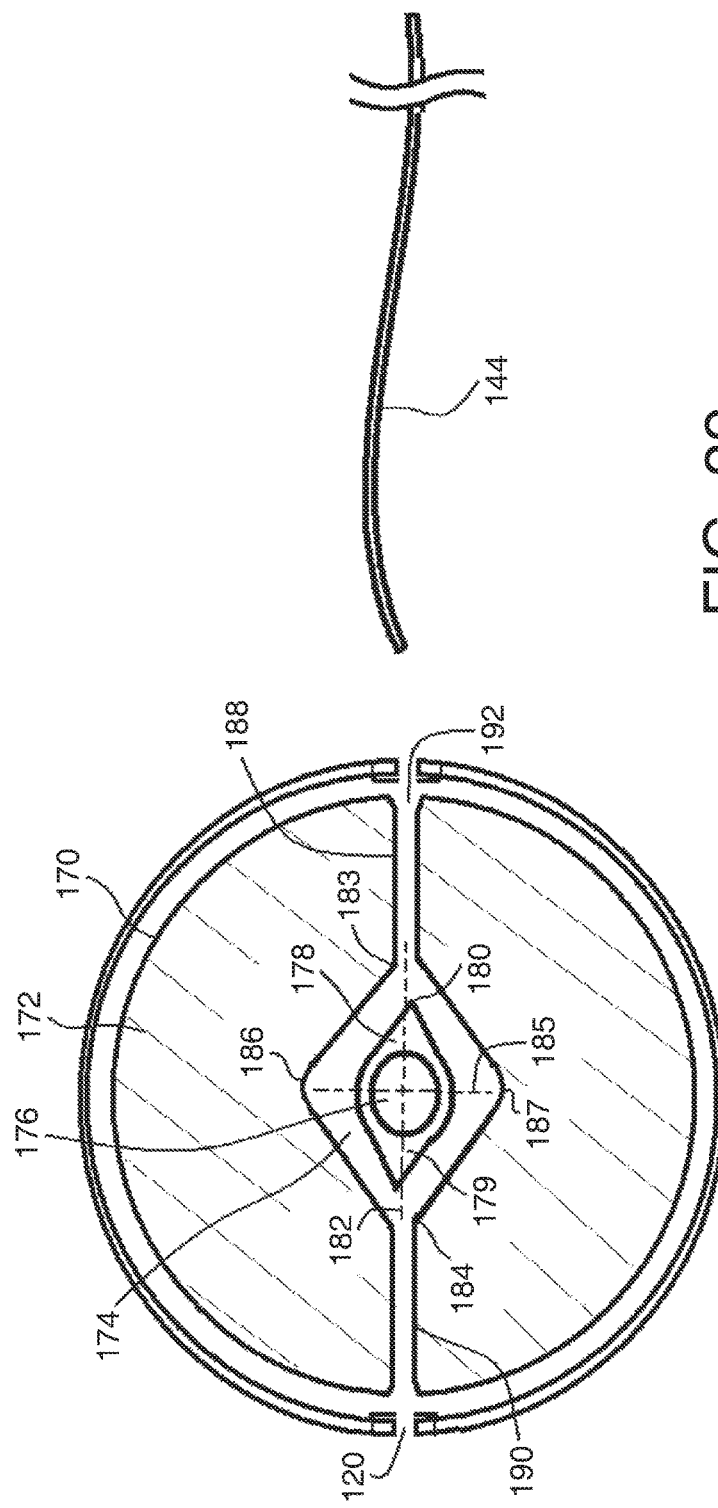

STRING TRIMMER HEAD WITH CURVED TRIMMER LINE GUIDE

RELATED APPLICATIONS

This application is a continuation-in-part of U.S. patent application Ser. No. 11/985,673, entitled, Bi-Directional Trimmer Head Spool with Curved Trimmer Line Guide, filed Nov. 16, 2007, which issued on Sep. 9, 2011 as U.S. Pat. No. 8,025,249, which claims the benefit of U.S. Provisional Patent Application 60/859,246, filed 16, 2006.

BACKGROUND OF THE INVENTION

1. Field of the Invention

In general, the present invention relates to string trimmers and the rotating heads of string trimmers. More particularly, the present invention relates to the mechanisms contained within string trimmer heads for winding or adding new lengths of trimmer line to the trimmer head.

2. Prior Art Description

String trimmer machines have been commercially sold for over a quarter of a century. In this period of time, there have been many variations to the design of the string trimmer machine and especially to the trimmer head.

The trimmer head is the part of the string trimmer machine that rotates. The trimmer head holds lengths of trimmer line that rotate with the trimmer head. The rotating trimmer line contacts and cuts vegetation as it spins.

There are many types of trimmer heads on the market. The most common types of trimmer heads are bump-feed trimmer heads and automatic-feed trimmer heads. Both types of trimmer heads contain an internal spool that holds a reserve of wound trimmer line. As the trimmer line wears away, it can be replaced from the internal spool. In a bump-feed trimmer head, a short length of line is released from the spool when the bottom of the trimmer head is impacted or "bumped" against a hard surface. In an automatic-feed trimmer head, a short length of line is released from the spool when a predetermined change in centrifugal forces occurs that indicates that the existing trimmer line has become too short.

Internal combustion engine and electric motor powered vegetation trimmers are commonly used to cut and trim grass, weeds, brush and other vegetation. The typical motorized trimmer comprises an elongate handle to which is connected an internal combustion or electric motor that rotatably drives a trimmer head located at a distal end of the handle. This machine is "hand held". The trimmer head (i.e., rotary cutting head attachment to drive shaft of trimmer), in turn, carries radially outwardly projecting cutting means which cuts the vegetation as the trimmer head rotates. In addition to "handheld" vegetation cutting machines there is also wheeled type vegetation trimmers which have are gas powered and utilize and engine that generates much greater horsepower than any "handheld" type machine, the trimmer and cutting machines are designed to cut very dense thick vegetation and brush. These DR Trimmer machines use some types of cutting heads that are used with the "hand held" trimmer machines.

The trimmer head may include one or more flexible monofilament line or rigid cutting means. Rigid cutting means typically assumes the form of blades fabricated from plastic and or metal and often have corrugations or scalloping about their peripheral cutting edges. They are a unitary one-piece cutting blade molded from a durable high strength plastic/metal material with plurality of cutting arms extending outward from the hub. The pivoting type rigid blades are attached circular pins mounted vertically on peripheral portion of trimmer head body and the body is attached directly to the trimmer machines drive shaft. The pivoting blade yields when they contact hard objects, thereby prolonging the service life of these blades. Other fixed rigid type blades mount directly to the trimmer drive shaft. Both of these above mention vegetation cutting blades are normally used to cut very dense and thick grasses, weeds to include brush. There is one other form of rigid type cutting blade that is used on hand held and wheeled type trimmer machines alike and it is main usage and application is for cutting, highly effective against weeds and small bushes, corn stocks, brush and even saplings up to 3" thick small diameter etc. This type of rigid blade is a metal disc that attached to the drive shaft of the trimmer machine and mounted around the peripheral of the metal circular plate is a series of chain saw cutting teeth as used on a "Chain Saw". All of these mentioned types of blades may cause considerable injury to the trimmer operator or other persons should they accidentally be struck by one of these types of blades if made of metal including hard rigid sharp plastic material during operation of the trimmer. Generally, weeds growing on footpaths between rice fields etc. have to be cut several times a year because they tend to be nested by pests. The weed cutting is usually very laborious, and thus various automatic weed cutters have heretofore been proposed and put to practical use, among which shoulder-hung weed cutters are very popular because of their small size and handling ease. In most of the shoulder-hung weed cutters, a driving-force transmission shaft or drive shaft, which is passed through a pipe-shaped handling rod, is rotated via an engine provided at one end of the handling rod so as to rotate a cutter blade provided at the other end of the handling rod.

In most cases, a human operator hangs the weed cutter on his or her shoulder using a hanging belt, and cuts weeds with the rotating cutter blade by gripping a U-shaped handle provided on an intermediate position of the handling rod to swing the handling rod in front and-rear and left-and-right directions. In recent years, there have been strong demands for further improvements in agricultural working environment. In the case of the shoulder-hung weed cutters too, there is an increasing demand for reduction in vibrations that are transmitted from the engine via the handling rod to the U-shaped handle, with a view to lowering the load on the human operator. Because the weed or plant cutters are often used in farmland or the like where no AC power source is available, they ordinarily employ, as a prime mover or drive source unit, a small engine that is not equipped with a balancer to attenuate secondary vibrations. The vibrations transmitted from the drive source unit to the drive shaft comprise two major components: one component delivered from the drive source unit via the drive shaft to the handling rod; and the other component delivered from the drive source unit directly to the handling rod. Example: U.S. Pat. No. 0,299,484 Wang; U.S. Pat. No. 6,052,907 Wang; U.S. Pat. Nos. 5,085,113; 4,744,148; 4,922,791; 4,627,322; 4,302,878 Bonforte; Flexible type of cutting means generally are fabricated as a continuous strand flexible monofilament plastic (i.e. Nylon) line wrapped about a spool contained within the trimmer head. In such devices, the plastic line is typically selectively dispensed by the operator of the trimmer apparatus manually. One species of these sorts of devices is semi-automatic in operation and utilizes the centrifugal force generated by rotation of the trimmer head to dispense trimmer line. Commonly known as "bump and feed" trimmers, these apparatus include an internal storage space for a spool of line to be dispensed responsive to an operator tapping the base of the trimmer head against a hard surface. An example of bump indexing trimmer head is shown in Example: Proulx, U.S. Pat. Nos. 6,279,235; 4,458,419. Both in light duty, medium and heavy duty gas & electric powered trimmers, the cutting means may be fabricated as a continuous strand flexible monofilament plastic line wrapped about a spool contained within the trimmer head. In such devices, the plastic line is typically selectively dispensed by the centrifugal force generated by rotation of the trimmer head. A disadvantage common to these sorts of devices is that the line quite frequently becomes jammed when a user attempts to dispense fresh line from the spool and the line prematurely breaks off at the eyelet because the diameter of the line is small and has little tensile strength when making contact with hard objects and heavy vegetation. When this occurs, the user generally must stop the trimming operation, disassemble the trimmer head, fix the jam and or extend line through the eyelet(s) and reassemble the trimmer head before resuming trimming. Such repeated disruption is very frustrating and time-consuming by the end user. It should be noted that spool heads automatic type, semi-auto, include a line cutting blade on the debris shield. When the head is bump on the ground and dispenses the line, the line generally extends more line than needed from the storage spool and this blade on the shield cuts off the extra line. Another species of vegetation trimmer cutting apparatus is an automatic spool trimmer head this type of trimmer cutting head is called "automatic trimmer head. This type requires no tapping on the ground and it always feeds out set length of trimmer line. Examples: Lingerfelt, U.S. Pat. No. 5,901,448; Zatulovsky, U.S. Pat. No. 4,942,664.

Another species of vegetation trimmer apparatus where trimmer line is selectively dispensed from a spool by an operator is fully manual in operation. Devices of this sort comprise one or more, typically spring-biased, indexing pins or buttons that are connected to one or more internal trimmer line carrying spools. In order to dispense trimmer line, an operator displaces the indexing pin(s) or button(s) from seating engagement with one or more holes provided in the trimmer head housing. Once the indexing pin(s) or button(s) are separated from the housing, the user either turns the internal spool(s) or pulls on the trimmer line itself from the spool in order to payout the line from the trimmer head. When the desired length(s) of trimmer line have been dispensed, the operator reseats the indexing pin(s) or button(s) into their associated indexing opening(s) in the trimmer head housing. Example: U.S. Pat. No. 4,145,809 Proulx; U.S. Pat. Nos. 4,271,595; 4,172,322; 4,097,991; 3,826,068 and 3,708,967. A new specie of spool trimmer heads has surfaced, which is very distinctly and substantially different from prior art examples of spool trimmer head described and reference above. Typically, reloading fresh line into a spool trimmer head is a difficult and time consuming process. All the prior art reference spool trimmer heads reference above "all" do require some form of disassembly of the trimmer head components prior to loading or reloading new trimmer line onto the spool. The reason I feel that this type of spool trimmer head should be considered as a separate specie is because this specie of trimmer is distinctly and substantially different from the all prior art spool trimmer heads because all of the following prior art patents and or applications. The spool trimmer heads being referenced all have one thing in common, these spool trimmer heads "all" do not require any form of disassembly of the trimmer head components prior to loading or reloading new line onto the spool. This type of spool trimmer head makes loading and reloading of trimmer line onto the spool trimmer head dramatically easier for the end user. Example: Kanou, U.S. Pat. No. 5,345,683; Griffini, U.S. Pat. No. 5,765,287; Everets, U.S. Pat. Nos. 5,659,960; 5,671,536; 5,806,192; 6,148,523; Stark, U.S. Pat. No. 6,263,580; Alliss, U.S. Pat. No. 6,854,185; Pfaltzgraff, U.S. Pat. No. 6,952,877; Proulx, US Patent Application 20050217120; Alliss, US Patent Application 20050252009. All spool type trimmer heads must have some form of anchoring means to secure one or more fixed lengths of line to the hub of the spool prior to commence wrapping the length(s) of line onto and around the spool hub.

Another species of vegetation trimmer heads employs finite or fixed cut lengths of monofilament (nylon) plastic line or string that can be quickly and easily replaced as they become broken or worn without need to resort to disassembly and reassembly of the trimmer head. In this category of trimmer heads the finite length(s} of trimmer line are securely held in a fixed position within the trimmer head body by different methods (i.e. weaving means, different types and forms of clamping means with and without biasing means, special injection molded flails that have special end portion of the cutting flail that holds the finite length of cutting line securely in the body of the trimmer head during cutting operations etc.). All of the these Fixed length type of line vegetation trimmer cutting heads provide the end user a more user friendly trimmer head product vs. the standard spool "bump and feed" product. They are much easier to load and replace worn flexible cutting line. These types of trimmer heads allow the end user the opportunity to be able to use a broad range of flexible line diameters from 0.065" to 0.155". These trimmer heads also are typically weigh less and are less expensive in cost to manufacture. And important benefit of the fixed length type vegetation cutting head, because it can receive and hold a wide range of different size line a customer can select the size of line that works best with size (hp) machine that they are using. Too large of a flexible cutting line diameter and too long of a length extending from the exit ports of the head will deplete the rpms and power because of air drag caused by the size of the cutting line. There is a wide variety of electric and gas powered trimmer machines manufactured and they also have wide range of power ratings per machine. It is important to select and use the right cutting attachment with different machines so that they will work efficiently and safety during operation. Examples of such devices are provided: U.S. Pat. Nos. 5,758,424; 5,887,348; 5,896,666 and 6,347,455; 4,756,146 Rouse; U.S. Pat. Nos. 5,901,448, 4,054,992 Ballas etc.

Many problems exist with traditional trimmer head designs that contain internal spools. Primary among those problems are problems concerning the winding of new trimmer line onto the internal spool once the original supply of trimmer line is exhausted.

Any trimmer head that has an internal spool also has a housing that surrounds that spool. In order to resupply trimmer line to the spool, the spool must be accessed within the housing. In many early trimmer head designs, the internal spool was accessed by disassembling the trimmer head and removing the spool from the housing. This, of course, required the use of tools and a significant expenditure of labor and time.

Recognizing the problem, some trimmer heads have been designed where the trimmer line can be added without any disassembly. In such prior art designs, new trimmer line is threaded through both the housing and the internal spool.

The internal spool is then rotated relative the housing to wind the trimmer line onto the spool. This process only works when the eyelet openings in the housing are precisely aligned with a channel in the spool to create a straight open conduit that enables the trimmer line to pass directly through the trimmer head.

Many trimmer heads have such straight conduits for the reloading of trimmer line. With such trimmer head designs, the trimmer line often binds as it is advanced through the conduit. The binding occurs because the trimmer line does not lay straight as it is passed into the trimmer head. The trimmer line is almost always coiled when purchased. Consequently, the trimmer line maintains a curved bias when it is removed from its packaging. Accordingly, the trimmer line has a tendency to curve as it is passed through the trimmer head. This causes the trimmer line to bind within the trimmer head or miss the housing eyelet on the far side of the trimmer head. This problem becomes compounded when the conduit through the trimmer head is not straight.

Many trimmer heads mount around a drive shaft from the trimmer machine. The drive shaft typically passes through the center of the trimmer head. As a consequence, forming a straight conduit through the center of the trimmer head is not possible. Rather, a curved conduit must be used. The use of a curved conduit in a trimmer head is exemplified in U.S. Pat. No. 7,640,668 to Iacona, and U.S. Patent App. Pub. 2008/0053052 to Cigarini.

When a curved conduit is used, the inserted trimmer line approaches the eyelet on the far side of the housing at an angle. This angle in conjunction with the natural curved bias of the trimmer line increases the tendency of the trimmer line to bind inside the trimmer head. Consequently, a user must try multiple times to correctly pass the trimmer line through the trimmer head. This takes time and labor and causes product dissatisfaction.

A need therefore exists for a trimmer head assembly with a housing and internal spool that presents a curved conduit that passes around a driveshaft, yet does not cause the inserted trimmer head line to bind. This need is met by the present invention as described and claimed below.

SUMMARY OF THE INVENTION

The present invention avoids the above referenced problems experienced in the prior art. This is a "bi-directional", spool trimmer head invention that does not require disassembly of the trimmer head components prior to reloading new trimmer line onto the enclosed storage spool. This invention is somewhat similar to my current US Patent, Non-Provisional Application 20050252009, Nov. 17, 2005, in a couple of aspects (i.e., bi-directional feature, invertible spool and latching and seating means between the spool and housing parts). There is multiple manufactures of handheld weed trimmer machines and models that are offered and sold on the market. There is "no" common or standard specification (i.e., design, type or size) in the industry for drive shaft arbors for attachment of a string trimmer head or other types of vegetation cutting tools to a handheld trimmer machine (gas/electric).

Overall the majority of manufactures use a threaded (nut and bolt) fastener means to secure the main body housing of the trimmer head to the threaded drive shaft arbor (male/female types). There are drive shaft arbors that are relatively "short" in length to attach a string trimmer head and then there are "longer" drive shaft arbors that extend through the top center opening of the trimmer head main housing and through the center of the spool and beyond. This invention pertains to the drive shaft arbors that are "longer". Example of prior art, easy load, spool trimmer heads with "longer" type drive shaft arbors as follows: Everets, U.S. Pat. Nos. 5,659,960; 5,671,536; 5,806,192; 6,148,523; Stark, U.S. Pat. No. 6,263,580; Proulx, US Patent Application 20050217120. All of these, easy load, spool trimmer head inventions require two separate fixed lengths of line for reloading the inner spool. Example of prior art, easy load, spool trimmer head with relative "short" drive shaft arbors as follows: Alliss, US Patent Application 20050252009; Kanou, U.S. Pat. No. 5,345,683; Griffini, U.S. Pat. No. 5,765,287; Alliss, U.S. Pat. No. 6,854,185; Pfaltzgraff, U.S. Pat. No. 6,952,877. Each of these, easy load, spool trimmer head inventions use only one separate fixed length to fully reload line onto the inner spool and each line guiding means through the spool are "linear". This easy load, spool trimmer head invention uses a trimmer line "continuous" guide passageway that is "nonlinear" for the purpose of by-passing the vertical drive shaft that passes through the center axis of the trimmer head body and spool. Also included in the invention is "insert stop" for the spool to prevent inadvertent misplacement of the spool with the bottom body member and the bump knob components.

The present invention is a trimmer head for a trimming machine. The trimmer head assembly includes a spool. The spool has a central tubular hub. The hub is hollow and defines a central opening that extends through the hub. The spool also has a top flange that radially extends from the hub, a bottom flange that radially extends from the hub, and a central flange that radially extends from the hub.

A trim line conduit is joined to the central flange. The trim line conduit has a first open end. The first open end leads to a first straight section. The first straight section leads to a curved central section. The curved central section leads to a second straight section. The second straight section leads to a second open end. The curved central section passes around the central opening of the hub without passing into the central opening.

A housing is provided that receives the spool therein. Eyelets are formed in the housing on opposite sides. An end cap is provided that connects with the housing and retains the spool within said housing.

When loading a new segment of trimmer line into the trimmer head assembly, the shape of the conduit enables the trimmer line to pass around the central opening in the spool without binding. Furthermore, the shape of the conduit reduces binding caused by the curve bias of the trimmer line.

Other details, objects and advantages of the present invention will become apparent as the following description of the presently preferred embodiments and presently preferred methods of practicing the invention proceeds.

BRIEF DESCRIPTION OF THE DRAWINGS

For a better understanding of the present invention, reference is made to the following description of an exemplary embodiment thereof, considered in conjunction with the accompanying drawings, in which:

FIG. 16 is a top isometric view of spool guide channel cover plate;

FIG. 17 is a top isometric view of the spool showing a non-linear trimmer line U-shaped guide channel;

FIG. 18 is a top isometric view of the spool assembled with the spool cover plate;

FIG. 24 is a top isometric view of turn bump knob showing extending key to mate and interlock with the spool;

FIG. 25 is a side isometric view of turn bump knob that illustrates close up view of the finger grips used for reloading and winding the inner spool;

FIG. 26 is a top cross section view of the bottom cap, the spool, the eyelets, the main housing body, showing clearly the linear and non-linear path the trimmer line travels via the guide channel from insertion of the line through a eyelet and exiting the eyelet on the opposite end of the trimmer head;

FIG. 27 is a top isometric view of the spool;

FIG. 31 is a cross-sectional view of a third embodiment of the present invention trimmer head assembly;

FIG. 32 is a cross-sectional view of a fourth embodiment of the present invention trimmer head assembly.

DETAILED DESCRIPTION OF THE DRAWINGS

Figure 1:
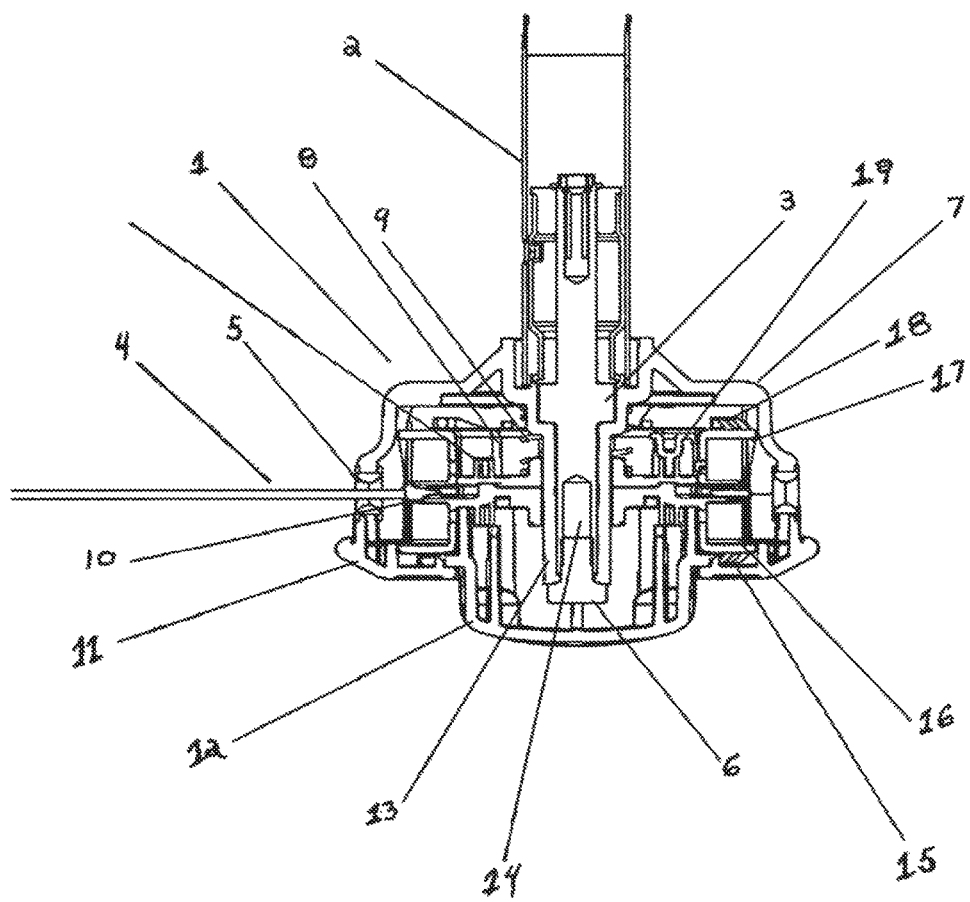
FIG. 1 is cross section view of the fully assembled trimmer head invention attached to a trimmer machine drive shaft which passes vertically through the center of the spool.

Although the present invention trimmer head can be embodied in many ways, only three exemplary embodiments are illustrated. These embodiments are selected in order to set forth three of the best modes contemplated for the invention. The illustrated embodiments, however, are merely exemplary and should not be considered a limitation when interpreting the scope of the appended claims.

Together, body members 7 and 11 are referred to herein as the trimmer cutting head housing. A threaded fastener (bolt or nut) 6 is used to attach the main housing body 7 to drive shaft 3. In order to secure body member 7 to the trimmer machine apparatus, a threaded fastener (bolt or nut) 6 is inserted through a central opening 14 of a extended housing to accommodate a drive shaft that extends through and beyond the center of a spool. As used herein, spatial terms such as "top", "bottom", "upper", "lower", etc. refer to the relative positions that the various structural components described herein would assume when trimmer cutting head 1 is "in use," i.e., when attached to the rotating drive shaft of a conventional internal combustion or electric powered grass/weed trimmer machine.

Figure 2:
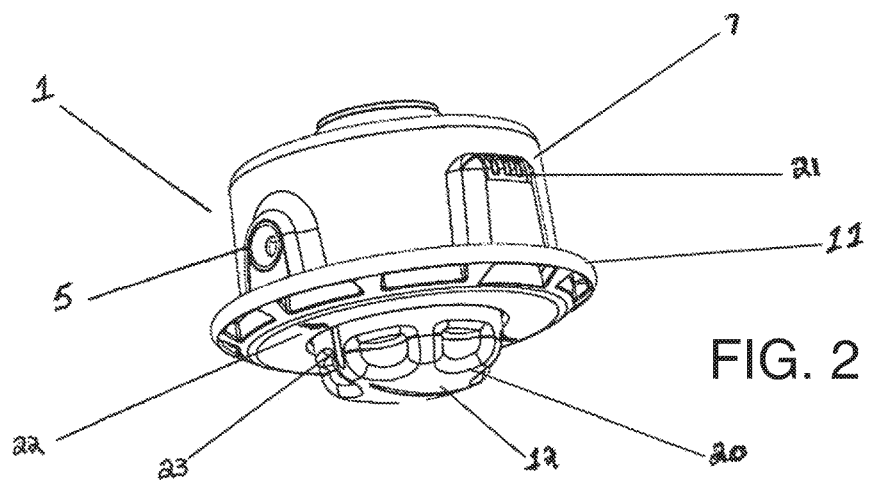
FIG. 2 is an exterior isometric view of the fully assembled trimmer head invention.

Referring to FIG. 1 there is shown an assembled cross section view of a first presently preferred embodiment of a trimmer cutting head 1 according to the invention that is used for cutting vegetation in conjunction with an internal combustion engine or electric motor powered trimmer apparatus commonly known as handheld grass/weed trimmer or brush cutting machine. Trimmer head 1 preferably comprises a rigid molded plastic first or "top" body member 7 and a rigid molded plastic second or "bottom" body member 11. Together, body members 7 and 11 are referred to herein as the trimmer head housing. Body members 7 and 11 may be releasably fastened to one another by a snap, threaded, J•slot or other releasable connection. For example, suitable fastening means may include generally stiff yet resilient tabs 22 (FIGS. 2, 3, 4) upwardly projecting from the body member 11.

Tabs 22 are adapted to pass through correspondingly shaped apertures 52 (FIGS. 2, 19, 20, 21). At their upper ends tabs 22 preferably have radially outwardly directed lips. As tabs 22 are inserted through apertures 52, the tabs flex radially inwardly until such time that lips pass completely through the apertures whereby the tabs assume their unflexed positions and the lips latchingly engage body member 11 with body member 7.

Alternatively, it will be understood that the lipped tabs or similar structure may be carried by the first body member 7 and corresponding slots may be provided, where appropriate, in the circumferential wall or the end wall of the second body member 11 in order to achieve the desired latching engagement between the first and second body members of the trimmer head housing.

Also shown in FIGS. 1, 2, 20, 26 are trimmer line metal eyelets 5 through which trimmer line passes when loading trimmer line into and discharging trimmer line from trimmer head 1 in the manner described hereinafter. The diametrically opposed metal eyelets 5 are securely mounted between the circumferential wall of the first and second body members 7 and 11.

Figure 6:
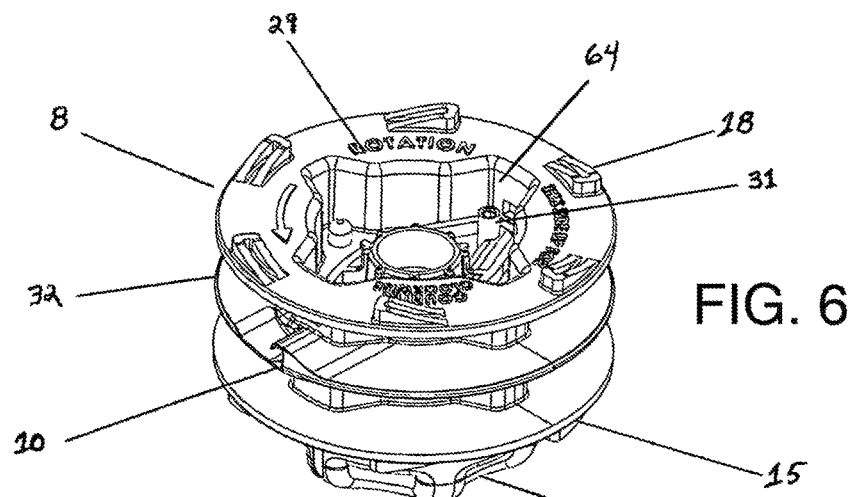
FIG. 6 is an isometric view of spool S and the bottom cap assembled as shown in FIG. 1.
Figure 7:
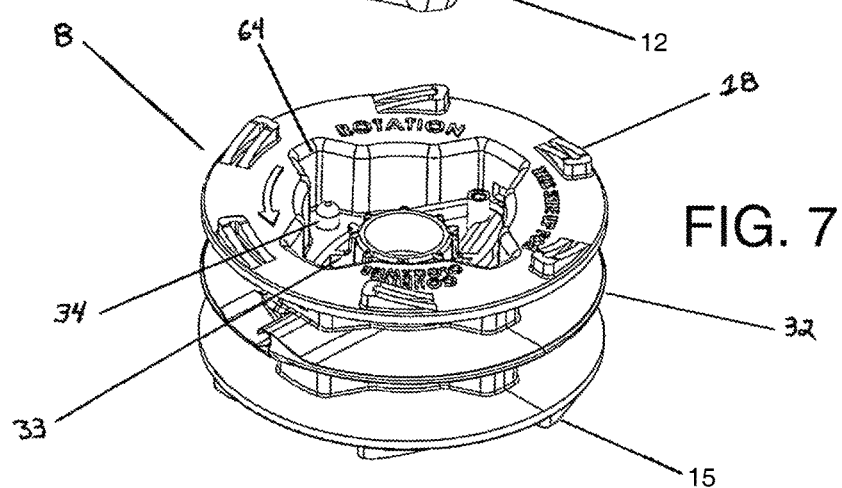
FIG. 7 is an isometric view of spool S not assembled to the knob as shown in FIG. 6.
Figure 8:
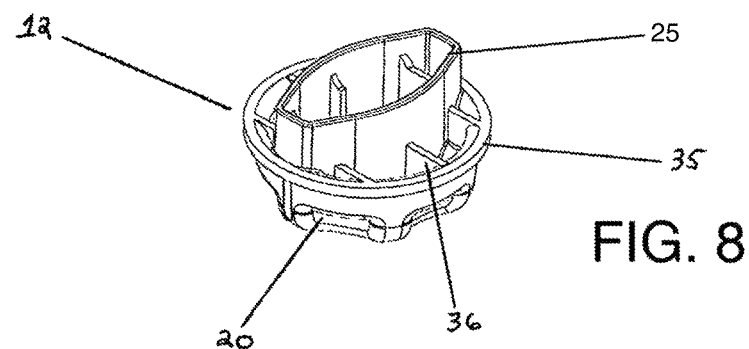
FIG. 8 is a top isometric view of the knob as shown in trimmer head FIG. 1-2.
Figure 9:
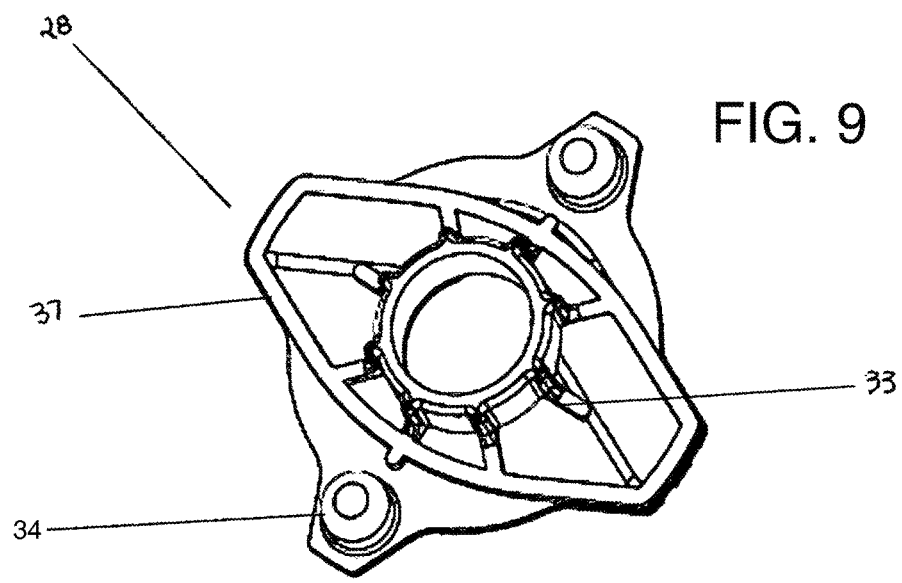
FIG. 9 is a top isometric view of 2S spool guide channel cover plate.
Figure 10:
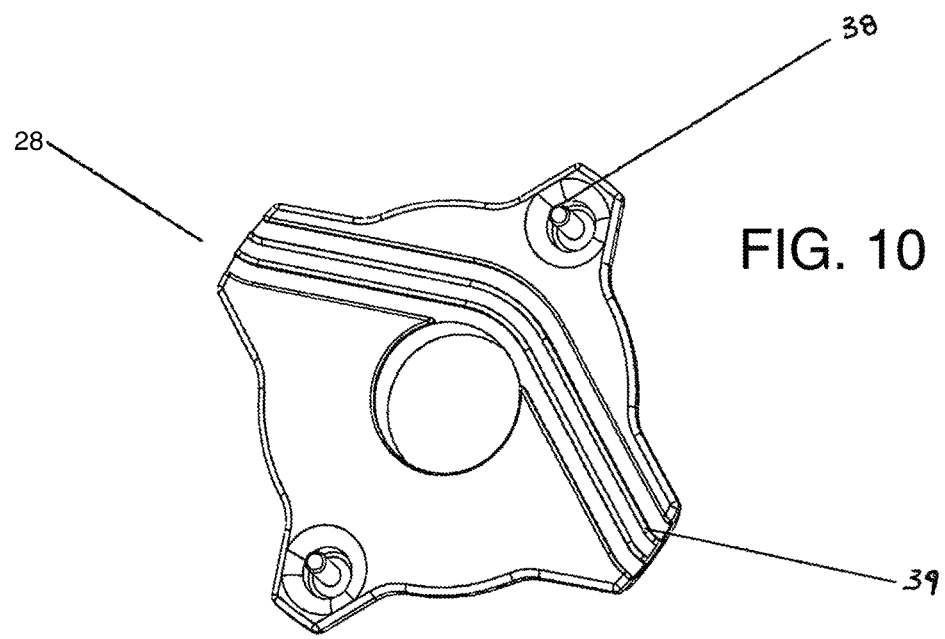
FIG. 10 is a bottom isometric view of the cover plate.
Figure 19:
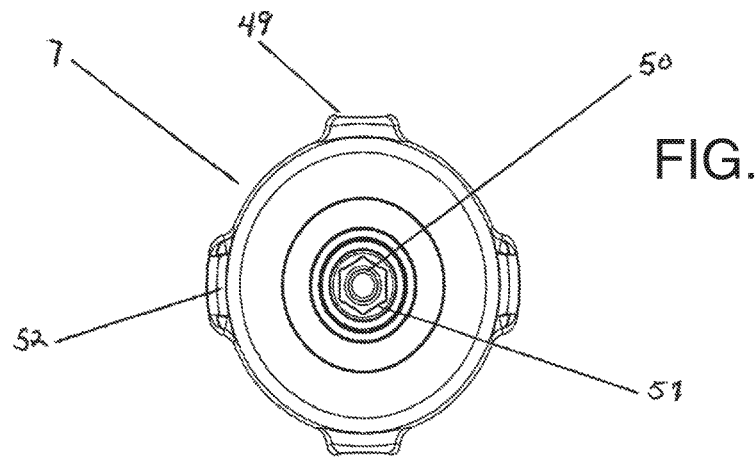
FIG. 19 is a top view of main trimmer head housing body.
Figure 20:
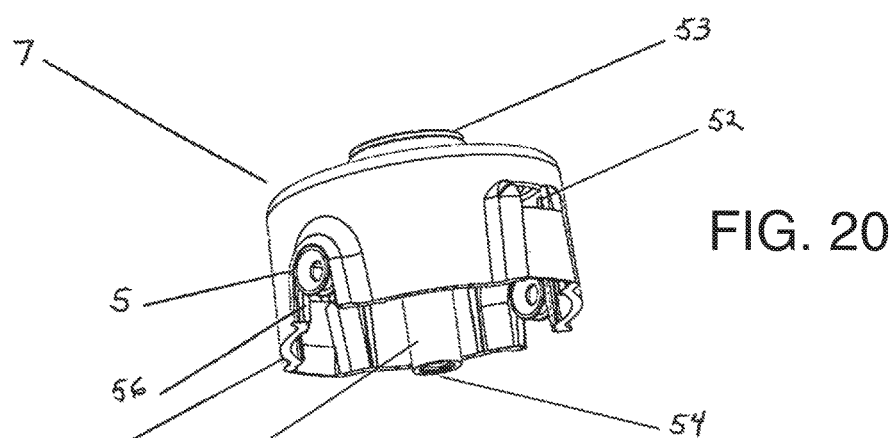
FIG. 20 is a side isometric view of the main trimmer head housing body shown with metal eyelets and the extended special extension of the main housing capturing the long center drive shaft to secure the main housing body firmly to the machine's drive shaft arbor.
Figure 21:
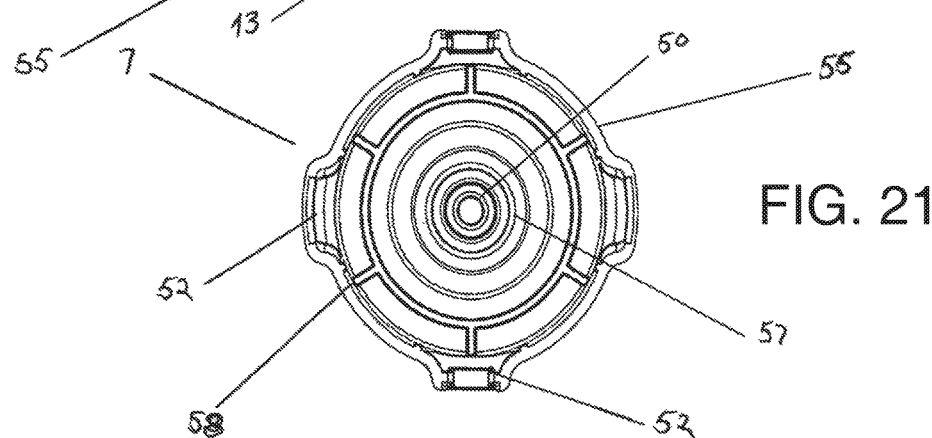
FIG. 21 is a bottom view of main trimmer head housing body.
Figure 22:
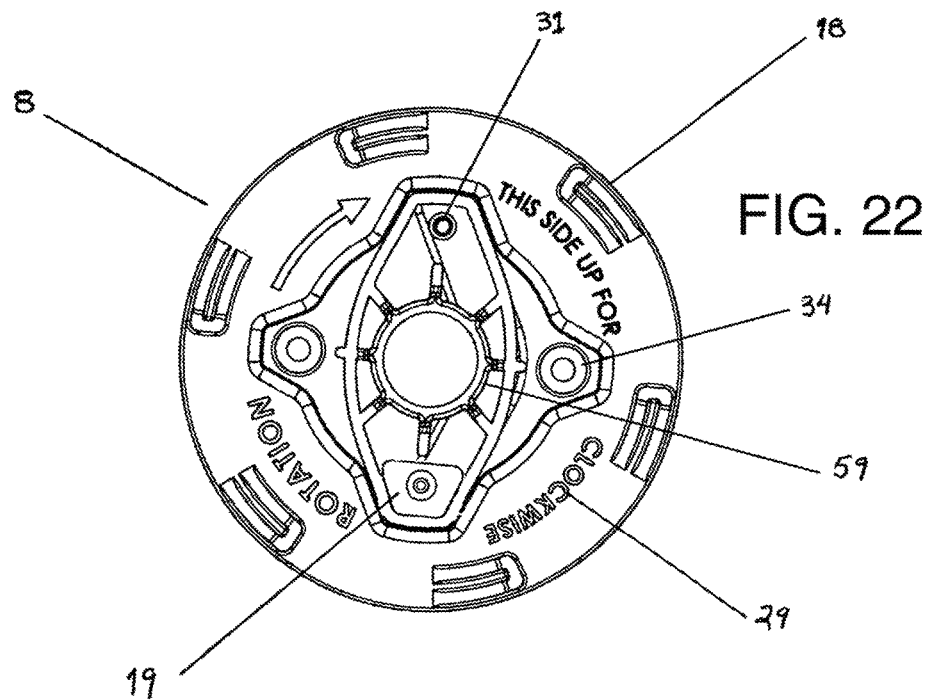
FIG. 22 is a top view of the spool which illustrates on which side of the spool to insert placement of insert stop for a trimmer machine that turns counterclockwise.
Figure 23:
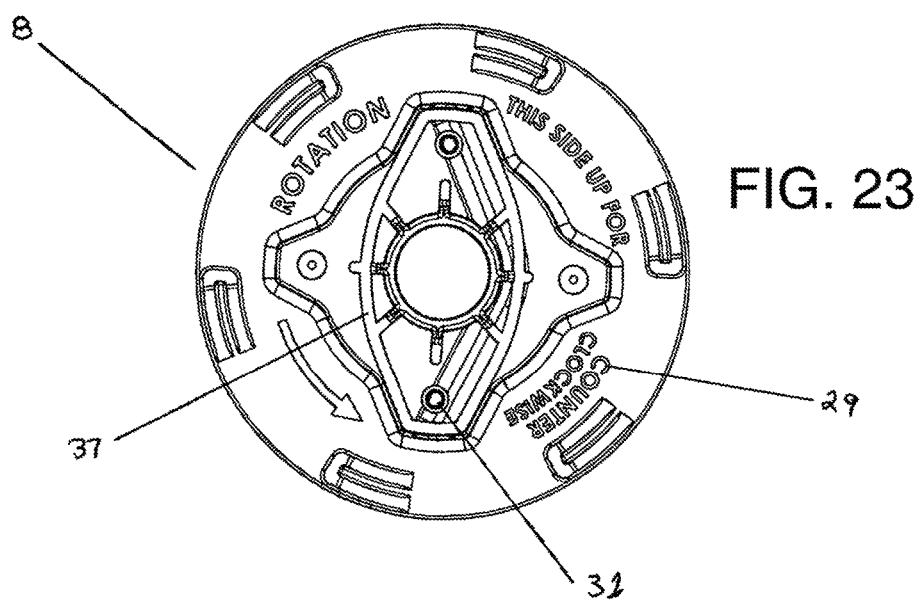
FIG. 23 is a top view of the spool illustrating that placement of insert stop can be placed on the opposite side of the spool at peg receiver openings on either end.

Metal eyelets 5 are preferably provided with a gently curved contour to reduce breakage of the trimmer line during operation of trimmer head 1. As depicted in FIGS. 19, 20 and 21 main body member 7 includes a central opening 50. Prior to assembly of trimmer head 1, the threaded arbor of a trimmer apparatus drive shaft is inserted through opening 50 and a fastener (nut/bolt) 6 is threaded onto the drive shaft arbor which secures body member 7 to the threaded drive shaft arbor. Trimmer head 1 further includes a trimmer line spool 8 that is rotatably supported in the trimmer head housing. Spool 8 comprises a cylindrical core bounded on its first and second (upper and lower) ends by circular disc-like flanges 17 and 16. According to this embodiment, spool 8 comprises a multiple chamber spool, that is, it is divided into two chambers or compartments by the provision an intermediate flange 32 located between flanges 17 and 16. Intermediate flange 32 is preferably coplanar with abutment means 37 (FIGS. 18, 23, 22), discussed below, provided within the core of spool 8. Abutment means 37 serves as an abutment or seat for resilient biasing means 9 e.g., a compression spring or the like, in a manner described below. In addition to biasing means 9, the latch means according to the embodiment of trimmer head 1 illustrated in FIGS. 1-26 comprise at least one projection 18, 15 carried by one of the trimmer head housing and or spool 8. The projection(s) cooperate with seat means in the form of at least one recess carried by the other of the trimmer head housing and the spool. Together the latch means and seat means function as indexing means to enable a user to selectively discharge trimmer line from the spool when desired or necessary. According to a presently preferred embodiment most clearly illustrated in FIGS. 1, 6, 7, 11, 14, 17, 18, 22, 23 and projection(s) 18 and 15 assume the form of generally arcuate wedge shaped formation(s) provided on the outer faces of both of the trimmer spool end flanges 17, 16. Each formation includes a substantially vertical stop surface and a sloped or inclined cam or glide surface. Preferably, the formation(s) are molded integrally into spool 8 at the time of its manufacture. In a presently preferred embodiment most clearly illustrated in FIGS. 6, 7 and 11 projection(s) 18, 15 are adapted to cooperate with seat means in the form of generally arcuate and or vertical depressions 26, 58 provided on the inner face of both first and second housing body member 11, 7. A projection 18, 15 received in a depression 26,58 is shown in FIG. 1. It will be understood that the relative positions of the projection(s) 18, 15 and depression(s) 26,58 may be reversed. That is, suitable sloped projection(s) may be provided in the inner faces of the first and second body member 7, 11 and cooperating depression(s) may be formed in the outer faces of both of the trimmer spool end flanges 17, 16. Projection(s) 18, 15 are normally retained in depression(s) 26, 58 under the influence of the compression force of biasing means 9.

In order to maintain biasing means 9 in stable orientation during operation of trimmer head 1, it is desirable that the bottom surface of first body member 7 be provided with a protruding ring or collar 251 the function of which is described below. In presently available spool trimmer head assemblies wherein the trimmer line may be wound onto a spool without disassembly of trimmer head housing to reload line onto the inner spool that easy load, these spool trimmer heads are "uni-directional" and can only function properly on a trimmer machine which drive shaft arbor turns in one (1) specific direction (clock-wise or counter clockwise).

Figure 11:
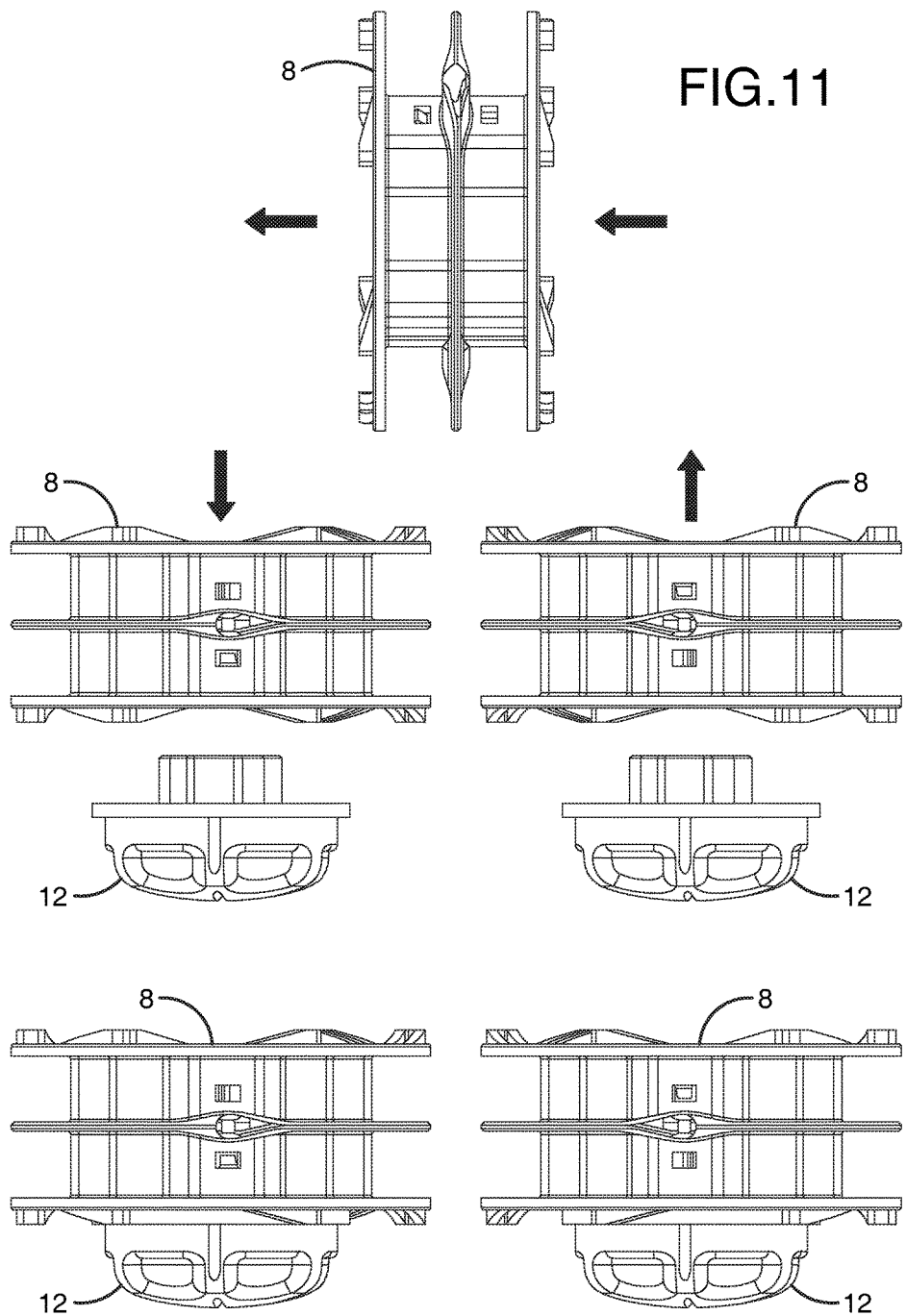
FIG. 11 is a drawings of spool S and the knob assembled and not assembled, drawings Illustrate how to convert the same spool so that the trimmer head can be used on a trimmer machine that has a drive shaft that turns in a clockwise and or counter-clockwise direction.
Figure 12:
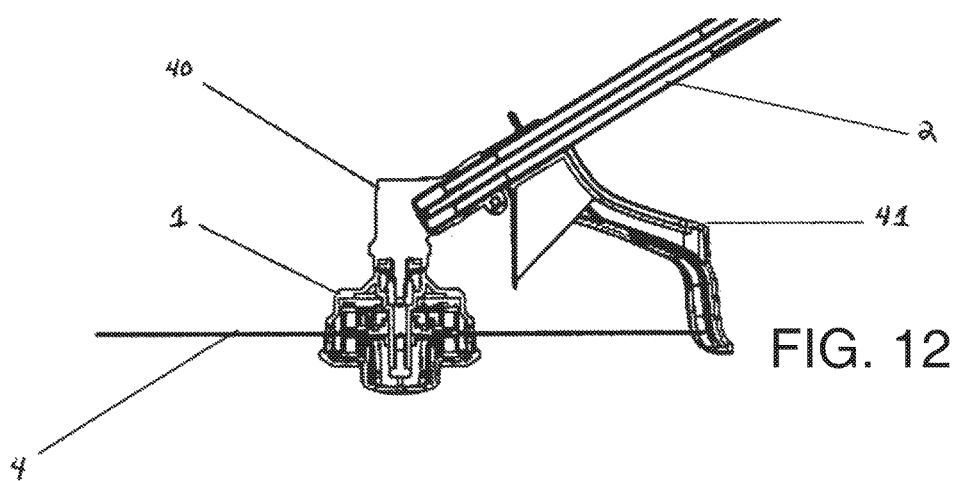
FIG. 12 is a drawing of trimmer head invention attached to a straight shaft, trimmer machine, which typically rotates counter-clockwise and has a vertical drive shaft that passes through the center of the spool.
Figure 13:
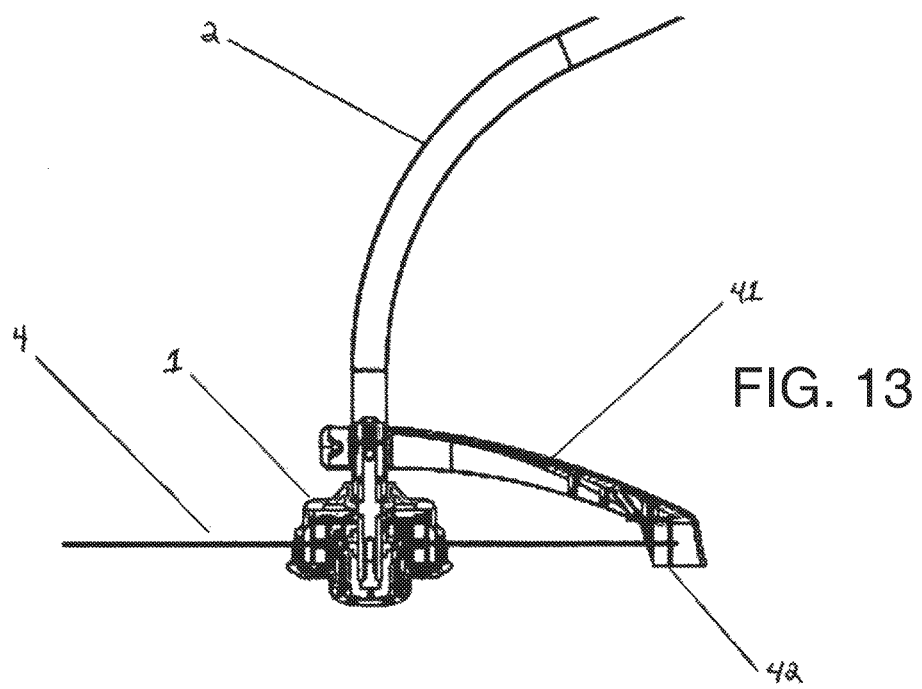
FIG. 13 is a drawing of trimmer head invention attached to a curved shaft, trimmer machine, which typically rotates clockwise and has a vertical drive shaft that passes through the center of the spool.
Figure 14:
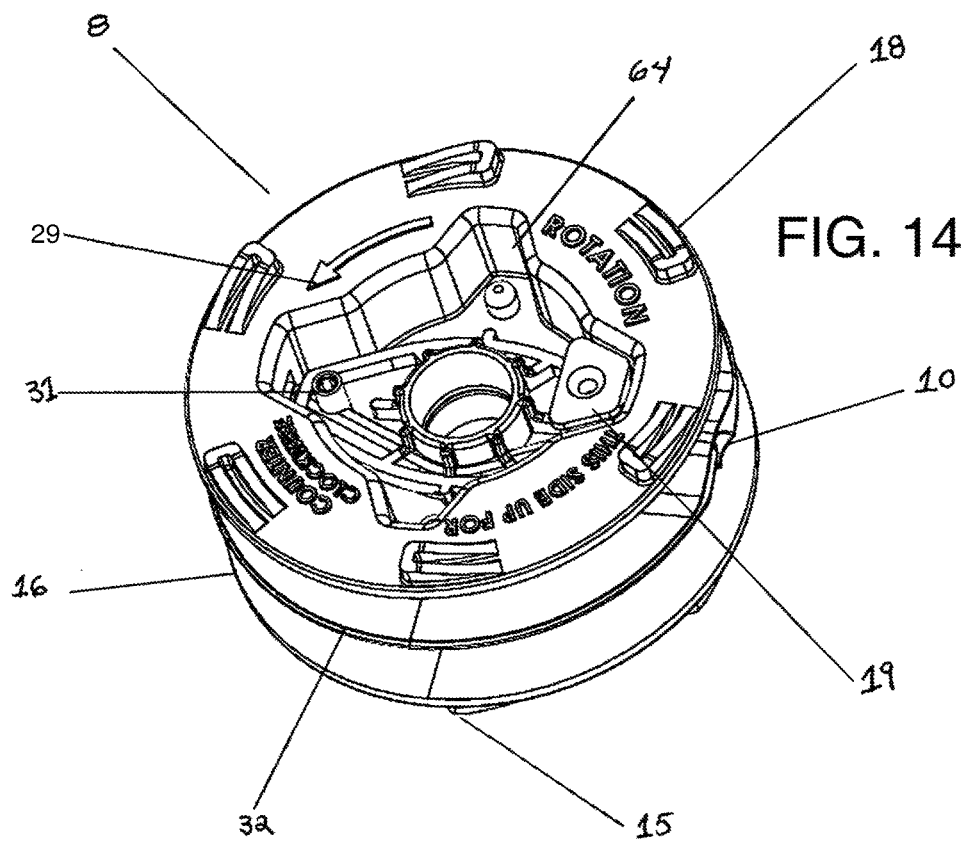
FIG. 14 is a top isometric view of the spool showing the placement of repositionable stop that prevents misplacement and assembly of the knob to the spool once the direction of the trimmer machine drive shaft has been determined.
Figure 15:
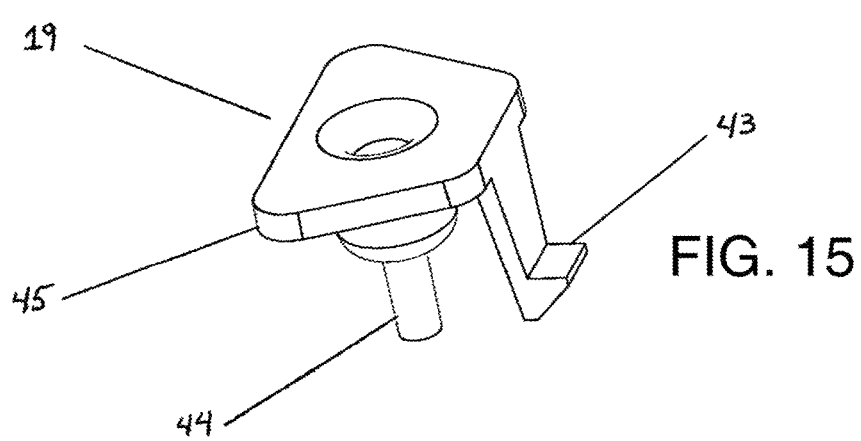
FIG. 15 is a top isometric view of reposition able stop with snap fitting as shown assembled to the spool in FIG. 14.

In contrast, trimmer line spool 8 may be received in the trimmer head housing with either spool flange 16 or spool flange 17 in operative engagement with the inner surface of body member 11. That is, spool 8 may be selectively placed in a desired disposition in body member 11 depending on the direction of rotation of the drive shaft of the trimmer apparatus with which trimmer head 1 is intended to be used (FIG. 11). Once the desired disposition of spool 8 has been determined a small removable (i.e., friction fit) semi-permanent type insert "stop" 19 (FIG. 1, 5, 14, 15, 22) can be placed in receiver openings 31,48 provided in spool center non-circular opening which acts as a "block" for misplacement of the spool 8 in the trimmer head housing 11, incorrectly. This insert "stop" can be permanently placed or non-permanently placed (i.e. removable). It would be made from plastic or rubber type material but not limited to. Accordingly, the cam surface(s) of the projection(s) 18, 15 on the flanges 17, 16 are inclined in such a way that spool 8 is capable of practical rotation in one direction (e.g., counterclockwise) when first flange 17 faces upwardly and practical rotation in the opposite direction (e.g., clockwise) when second flange 16 faces upwardly (FIG. 11).

Figure 3:
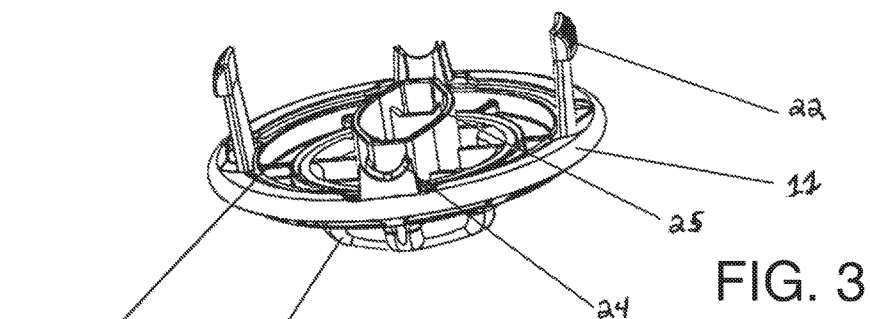
FIG. 3 is a top isometric view of the bottom cap and the knob assembled as shown in trimmer head FIGS. 1-2.
Figure 4:
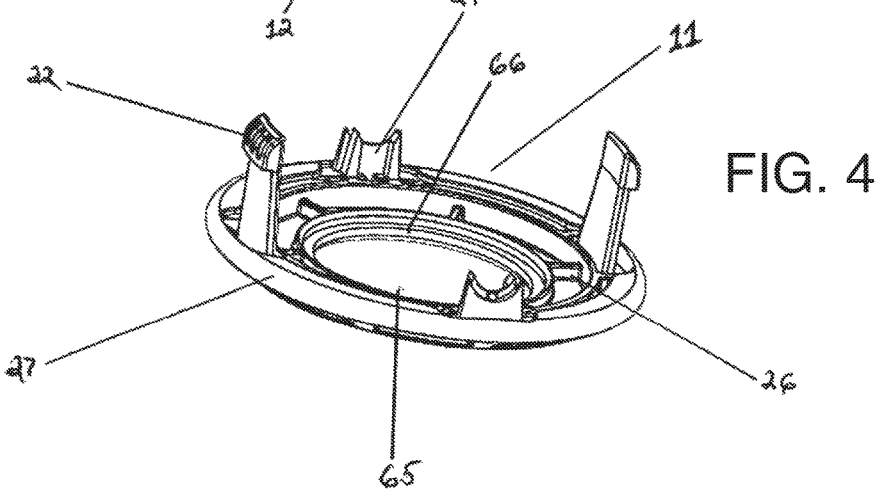
FIG. 4 is a top isometric view of the bottom cap as shown in trimmer head of FIG. 1-2.
Figure 5:
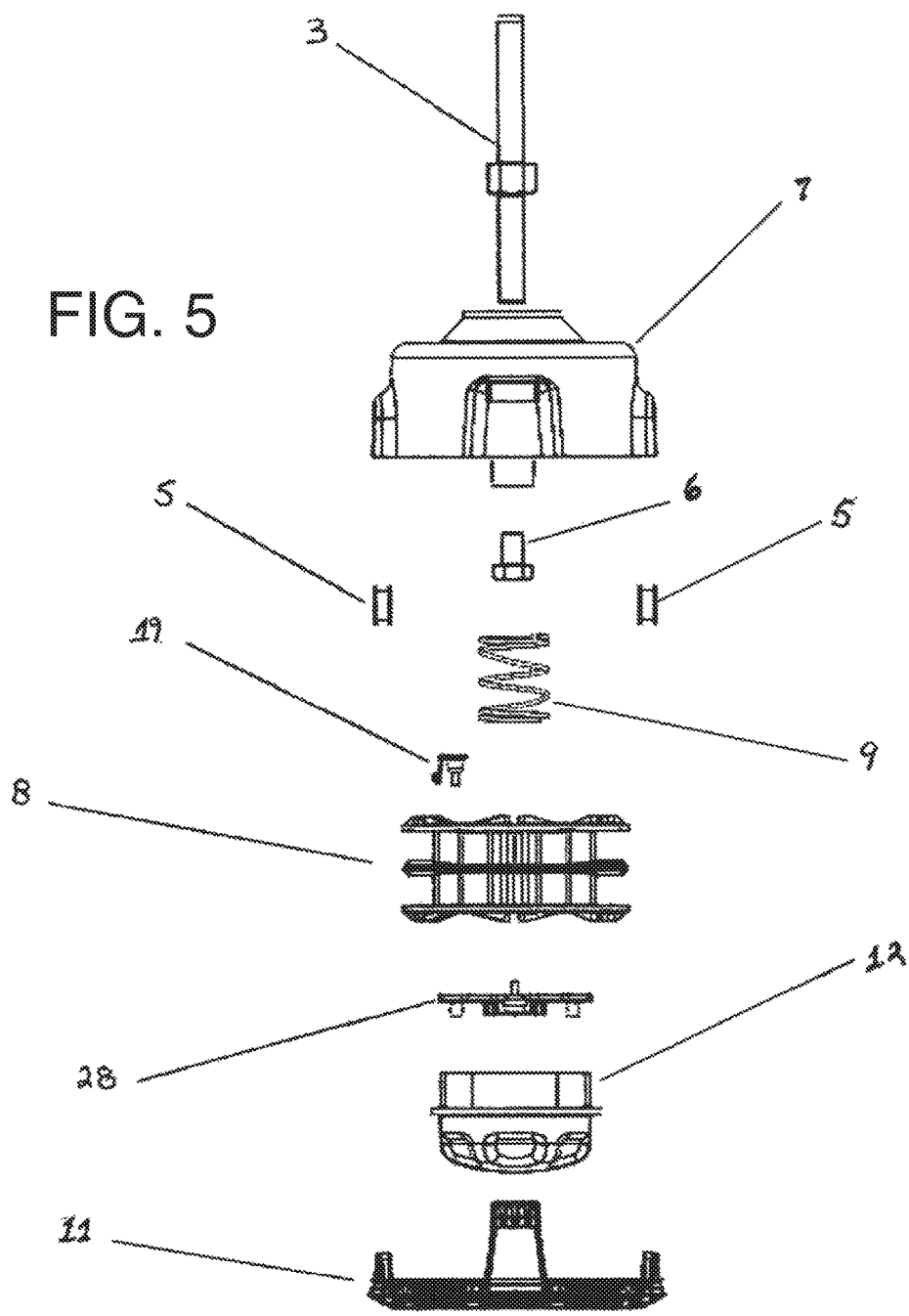
FIG. 5 is an exploded view all trimmer head parts as shown in trimmer head FIGS. 1-2.

With this capability, this spool trimmer head may be effectively used with essentially any powered vegetation trimmer, regardless of whether the trimmer's drive shaft rotates clockwise or counterclockwise. Referring to FIGS. 6, 7, 14, 17, 18, 22, 23 and 27, it will be seen that, extending inwardly from the outer surfaces of spool flanges 16, 17 and terminating at abutment means 37 is a pair of opposed sockets 64. In the illustrated embodiment, sockets 64 have a generally noncircular shape. Referring to FIG. 3, 8, 24, 25 there is shown a trimmer spool turning member 12 suitable for enabling a user to wind trimmer line onto spool 8. Trimmer spool turning member 12 comprises a knob portion 12 that is adapted to project through a central aperture 65 (FIGS. 3, 4) provided in the second body member 11. Knob portion 12 is preferably provided with a plurality of raised grip enhancing formations about its periphery. Trimmer spool turning member 12 further comprises a drive portion 37 which is separated from knob portion 12 by a radially outwardly directed flange 35. Flange 35 is adapted to rest against the inner face of the closed end of the second body portion 11. Preferably, the inner face of the closed end of the second body portion surrounding central aperture 65 is provided with a circular seat 66 (FIGS. 3 and 4) which is dimensioned to closely receive knob flange 35 in the manner shown in FIG. 3, drive portion 37 is sized and shaped to essentially matingly cooperate with sockets 64 of trimmer line spool 8. In the illustrated embodiment, therefore, the drive portion 37 of trimmer spool turning member 12 is generally a non-circular symmetric shape to permit its insertion into either of the spool sockets 64. It will be appreciated, however, that the mating spool sockets 64 and drive portion 37 are not limited to any particular shape. Indeed, they may assume any mating shape other than a purely circular configuration that will effectuate rotation of spool 8 by rotation of knob portion of 12. It should be noted that spool cover plate 28 (FIG. 9, 10, 16, 17, 18) is placed in spool socket 64 of spool 8 by a assembly person/worker at plastic injection mold factory. 28 and 8 to be sold as preassembled.

Cover plate 28 has insert pegs 38 that are to be joined with receiver openings 67 within the spool socket that has open face U shaped "non-linear" portion of trimmer line guide channel exposed. Spool cover plate is a friction fit assembly and this part once placed can not easily be removed and when the trimmer head is fully assembled this part is held in place either being biased by spring 9 and or abutment to 37 of bump/turn knob 12 which is also biased by spring 9. Metal Eyelets 5, (FIG. 1, 2, 5, 20) are fixed and preassembled to main housing body 7 by a assembly person/worker. The eyelets simply slide in to a tapered side wall of main housing body 7 with a friction fit. The eyelets can be installed by hand without the use of tools and removed and replaced by hand as well. Assembly of trimmer head 1 is as follows. A user first inserts the knob portion of trimmer spool turning member 12 until knob flange 35 comes to rest against the inner face of the closed end of the second body portion 11. He or she then places trimmer line spool 8 into the second body portion 11 while bringing one of the spool sockets 64 into mating engagement with the drive portion of trimmer spool turning member 12. When inserting the spool, the user must take care to face either spool flange 17 or spool flange 16 upwardly depending on whether they have trimmer machine that has a drive shaft arbor that turns either clockwise or counterclockwise onto the spool (the direction of winding is dictated by the direction of rotation of the trimmer apparatus drive shaft: if the drive shaft rotates counterclockwise, then the trimmer line winding direction is clockwise, and vice versa). Instructional message and directional symbols 29 (FIG. 14, 17, 18) are molded on spool flanges 17, 16 to aide user from misplacement of spool with 11 and 12. Biasing means 9 is then placed into the open upwardly facing socket 64 and first body member 7 is brought into closing engagement with second body member 11.

Each socket 64 is preferably provides for placement a small removable (i.e. friction fit) semi-permanent type insert "stop" 19 (FIG. 1, 5, 14, 15, 22) can be placed in receiver openings 31,48 provided in spool center non-circular opening which acts as a "block" for misplacement of the spool 8 in the trimmer head housing 11, incorrectly. If a end user does not use or looses "stop" 19 and errors in properly placing the spool within the trimmer housing, the body member 7, 11 may be separated to permit the spool to be inverted into the proper disposition.

Referring again to FIGS. 26, 27, 17, 11, 14, 7 and 6, it will be seen that spool 8 when joined with spool cover plate 28 includes a continuous closed "non-linear" trimmer line guide passageway formed coplanar with intermediate spool flange 32. Trimmer line guide means is a continuous closed "non-linear" passageway passing from a first enlarged portion 10 of intermediate spool flange 32 through abutment means 33 (FIGS. 7, 6) and through a second (opposite end of spool) enlarged portion 10 of intermediate spool flange 32. As seen in FIGS. 26, 27, the passageway of trimmer line guide means communicates with oppositely oriented guide openings in the first and second enlarged portions 10 of intermediate flange 32 that are constructed and arranged to ensure that trimmer line is properly wound on both upper and lower chambers of spool 8 equally during reloading of trimmer line onto the spool 8. Also, it is preferable that the opposite open ends of the passageway of trimmer line guide means be funnel or flare shaped, as at 10 (FIGS. 6, 7, 11) to facilitate insertion of trimmer line into the passageway. In order to load trimmer line 4 into trimmer head 1, the passageway of trimmer line guide means 10 is first brought into alignment with trimmer line exit ports (metal eyelets) 5. Then, using one fixed length of line long enough to fully load the inner spool 8 (note: use manufactures recommended length), take one end length of trimmer line and insert it into either eyelet 5 and by feed/push the line through trimmer line guide means of spool 8 until it passes out of the opposite exit eyelet 5. The trimmer line should then be adjusted so that approximately equal lengths of line project from each exit port. The user then winds the bump/turn knob portion 20 of the trimmer spool turning member 12 in the direction that is free to turn which turns the inner spool and the line is drawn into the housing and wound upon the upper and lower chambers of spool 8. The sloped surfaces of projections 18, 15 allows a person to be able to easily turn knob 12 which ratchets in one direction and can not move in the opposite direction. As knob 12 is turned projections 18, 15 makes contact with indexing ribs 26 in bottom housing 11 that glide upward and over the rib and then drop in to the depression which locks the spool from turning in the opposite direction. As is known in the art, the substantially vertical stop faces of projections 18, 15 prevent uncontrolled discharge of trimmer line during vegetation trimming. Trimmer head 1 is a bump indexing variety of trimmer head. That is, it permits user-controlled discharge of trimmer line utilizing the centrifugal force generated by the rapidly rotating head. More particularly, when the bottom of knob portion 60 of the trimmer spool turning member 12 is tapped against a hard surface, the biasing force of biasing means 9 is momentarily overcome, whereby the substantially vertical stop faces of projections 18, 15 are momentarily displaced from contact with the corresponding substantially vertical stop faces of depressions 26. During this brief instant, centrifugal force cause trimmer line 4 to be discharged through metal eyelets 5. Thereafter, the biasing means 9 re-seats the spool into engaging contact between the stop faces of projections 18, 15 and their counterparts in depressions 26. It is also possible to use trimmer head 1 in a fully manual mode. As such, when the user desires to extract trimmer line from the head, he or she brings trimmer head to a complete stop, pushes the knob portion 60 inwardly against the biasing force of the biasing means while turning the knob and pulling on the line to extract the desired length of line from the spool. When sufficient line has been discharged, the user releases the knob and resumes trimming.

Figure 28:
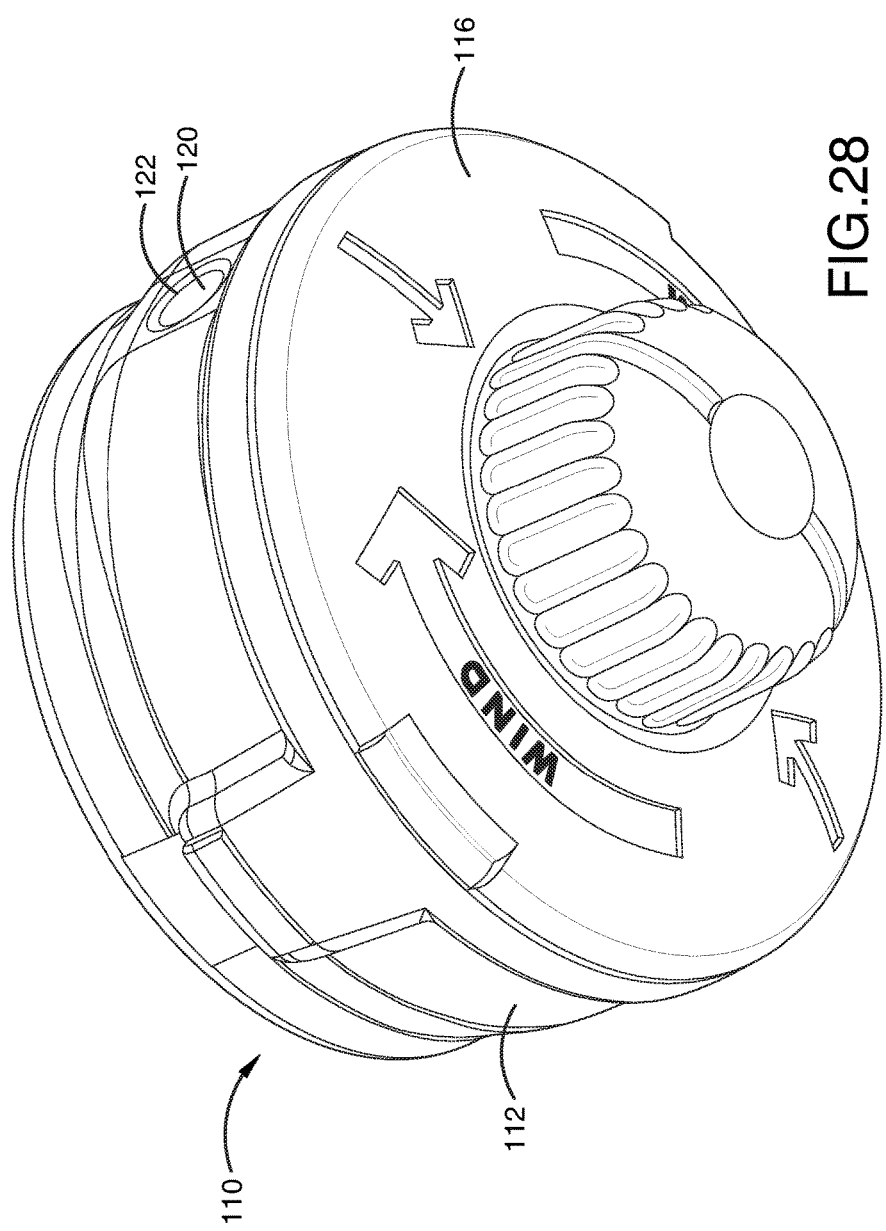
FIG. 28 is a perspective view of a second exemplary embodiment of a trimmer head assembly.
Figure 29:
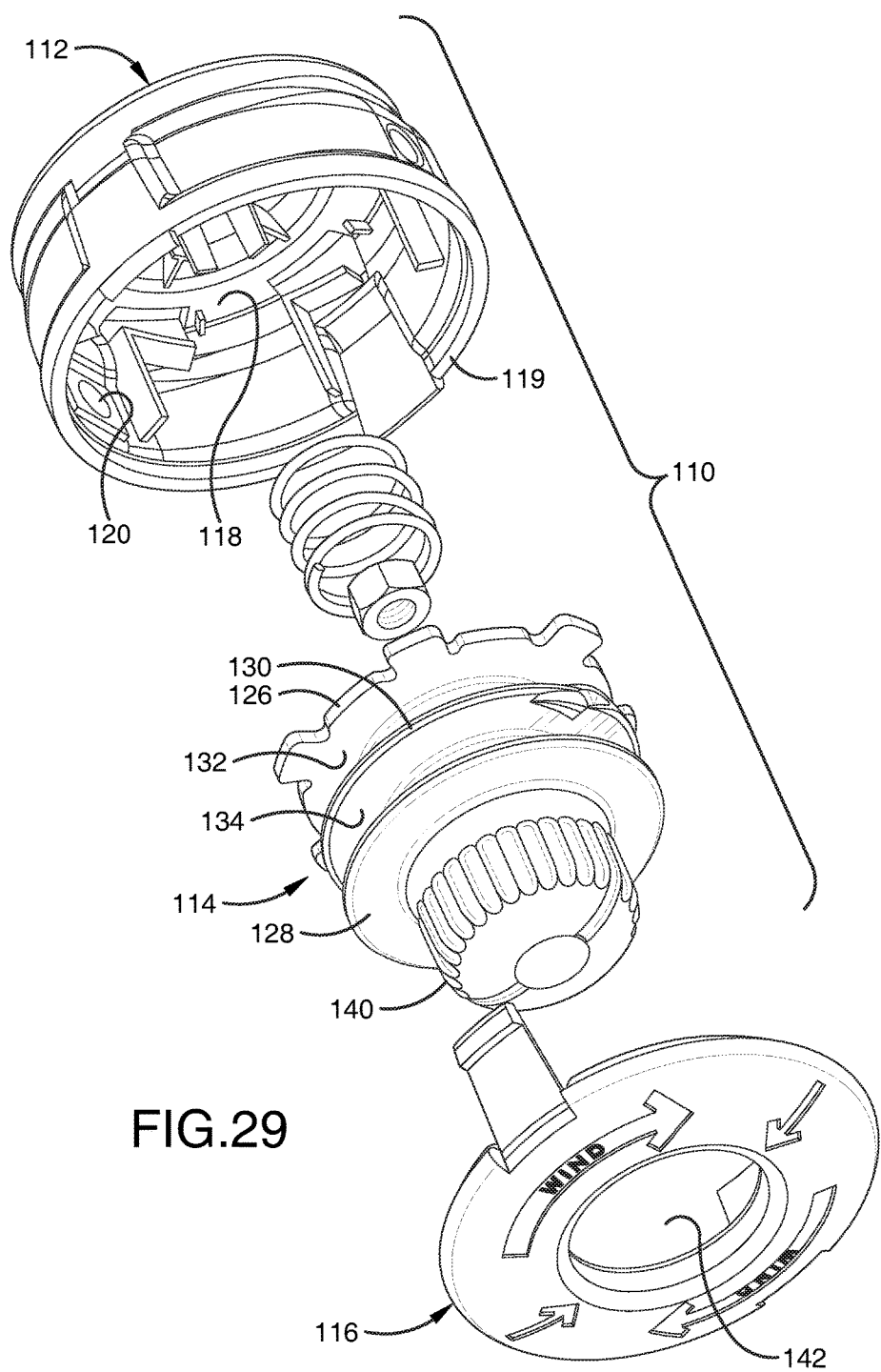
FIG. 29 is an exploded view of the embodiment of FIG. 28.
Figure 30:
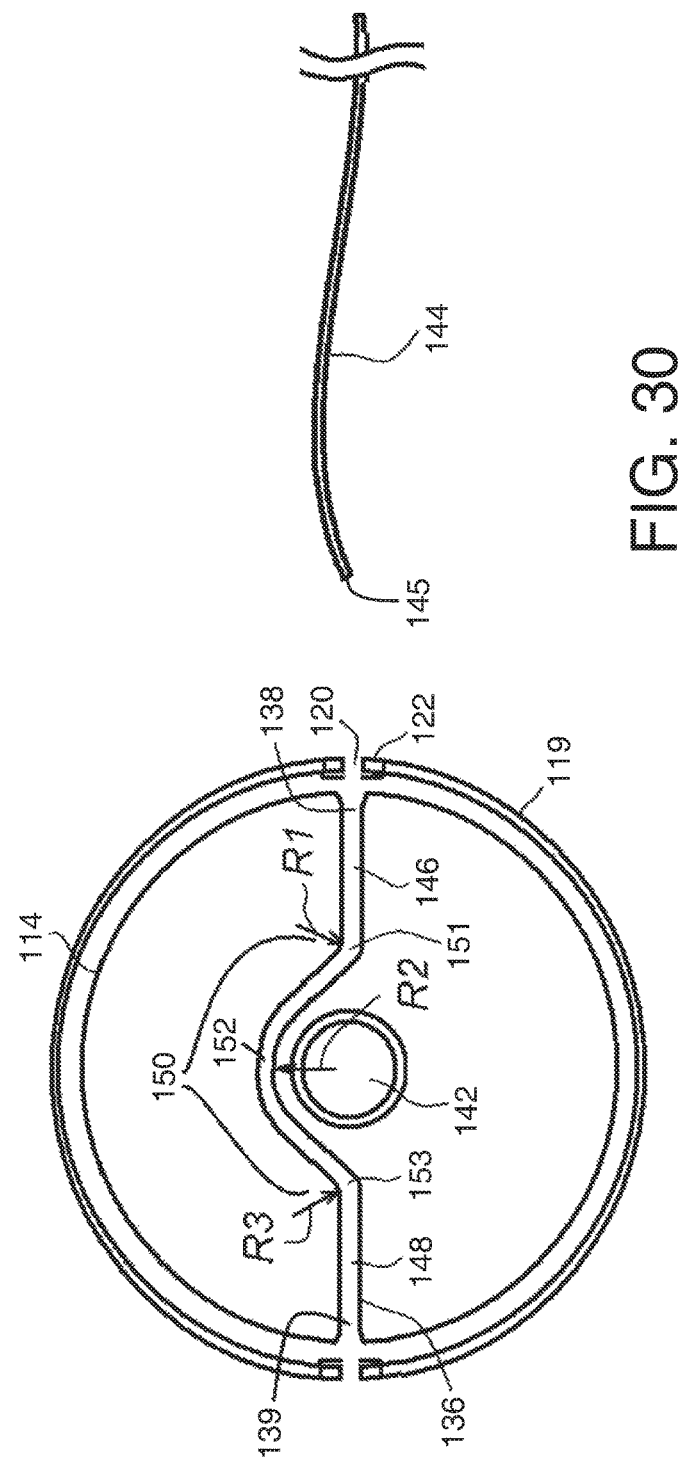
FIG. 30 is a cross-sectional view of the second exemplary embodiment of FIG. 28, viewed along section line 30-30.

Referring simultaneously to FIG. 28, FIG. 29, and FIG. 30, a first exemplary trimmer head assembly 110 is shown. The trimmer head assembly 110 attaches to the drive shaft of a string trimmer machine (not shown), which may rotate the trimmer head assembly 110 either clockwise or counterclockwise depending upon the model of the string trimming machine being used. The trimmer head assembly 110 is comprised of three major molded plastic parts. The major plastic molded parts include a primary housing 112, a spool 114 and an end cap 116 that holds the spool 114 within the primary housing 112.

The primary housing 112 defines an open interior 118. The top surface 119 of the housing 112 is closed, except for a mounting hole that permits the passage of the drive shaft into the housing 112. The bottom of the housing 112 is open, therein providing easy access to the open interior 118 of the housing 112. The periphery of the open interior 118 of the housing 112 is defined by a cylindrical wall 119 that extends downwardly from the periphery of the top surface 119.

At least two string eyelets 120 are formed through the cylindrical wall 119. The string eyelets 120 are diametrically opposed. The housing 112 may contain thickened regions about each of the string eyelets 120 to compensate for the wearing of the plastic at the string eyelets 120. Furthermore, optional wear rings 122 may be provided within the string eyelets 120. The wear rings 122 can be made from metal, ceramic, or a hard plastic that resists contact wear better than does the plastic material of the remainder of the housing 112.

The spool 114 has a central hub 124. The central hub 124 is tubular in shape and has three primary flanges 126, 128, 130 that define two trimmer line winding areas 132, 134. A trimmer line conduit 136 is coupled to the central flange 130. The conduit 136 has a first open end 138 and an opposite second open end 139. The details of the conduit 136 are later explained.

The spool 114 passes into the interior 118 of the housing 112. The end cap 116 holds the spool 114 in place. The spool 114 has a projecting knob 140 that extends through an opening 142 in the end cap 116. Accordingly, when the spool 114 is assembled within the trimmer head assembly 110, the spool 114 can be manually rotated within the housing 112 by grasping and turning the projecting knob 140.

To load a length of trimmer line 44 onto the spool 14, the spool 14 is manually rotated until the two open ends 38, 39 of the conduit 36 align with the two eyelets 20. Indicia 17 in the form of arrows are provided to align with the open ends on the spool 14 (See FIG. 2) to facilitate visualization of the alignment of the open ends with the eyelets 20. A free end 45 of the trimmer line 44 is then advanced into the conduit 36 through one of the eyelets 20. The advancement of the trimmer line 44 is continued until the trimmer line 44 emerges out of the opposite open end 39 of the conduit 36 and passes through the opposite eyelet 20. The trimmer line 44 can then be wound onto the spool 14 by rotating the protruding knob 40.

In order for the rewinding process to work, the open ends 138, 139 of the conduit 136 must be aligned with the eyelets 120 of the housing 112. Furthermore, the curved bias of the trimmer line 144 cannot cause binding within the conduit 136. In order to reduce the likelihood of binding, the curved bias in the trimmer line 144 is compensated for by the structure of the conduit 136.

Referring now solely to FIG. 30, it can be seen that the conduit 136 generally has an omega shape. That is, the conduit 136 has two straight sections 146, 148 and a curved central section 150. The first straight section 146 extends from the first open end 138 of the conduit 136 to the curved central section 150. Likewise, the second straight section 148 extends from the second open end 139 of the conduit 136 to the curved central section 150. The combined length of the straight sections 146, 148 is at least as long as the distance D1 between the straight sections 146, 148 that is occupied by the curved central section 150.

Each straight section 146, 148 is linearly aligned with each other and lays perpendicular to the exit planes of the open ends 138, 139. The curved central section 150 begins at an upward bend 151 having a first radius of curvature R1. The upward bend 151 transitions into a downward bend 152 having a second radius of curvature R2. Lastly, the downward bend 152 transitions into a lateral bend 153 that reorients the conduit 136 back onto its original direction. The lateral bend 153 has a third radius of curvature R3. The radii of the various bends 151, 152, 153 depend upon the radius of the central opening 142 in the spool 114. It is preferred that the various radii be between 5 percent and 20 percent larger than the radius of the central opening 142. In this manner, the curved central section 150 remains relatively close to the exterior of the central opening 142.

When the trimmer line 144 enters the first straight section 146, the first straight section 146 guides the trimmer line 144 into the curved central section 150. When the trimmer line 144 exits the curved central section 146, the trimmer line enters the second straight section 148. The second straight section 148 has a long enough length to eliminate any bias curvature embedded within the plastic of the trimmer line 144. Accordingly, when the trimmer line 144 exits the second straight section 148, the trimmer line 144 has been set on a straight path and reaches the second housing eyelet 120 without any binding.

In the embodiment described, a curved central section 150 is shown. If the incoming trimmer line 144 has a downward curve bias and the curved central section 150 curves upwardly, there is potential for the trimmer line 144 to bind. To eliminate this potential problem, two curved central sections can be made, wherein one is on either side of the central opening 142. Such an embodiment is shown in FIG. 31.

Since the alternate embodiment shown in FIG. 31 has many of the same features as the originally described embodiment, the same reference numbers will be used to describe the same features. Referring to FIG. 31, it can be seen that two curved sections 150, 160 can be created between the two straight sections 146, 148. When a segment of trimmer line 144 is inserted onto one of the straight sections 146, 148 and that segment reaches the two central curved sections 150, 160, the natural curved bias of the trimmer line 144 will cause the trimmer line 144 to enter either the first central curved section 150 or the second central curved section 160. Since the natural curved bias of the trimmer line 144 creates the selection, the trimmer line 144 is not guided against its bias and the potential for binding is removed.

In the embodiments previously described, the conduits are completely enclosed between their open ends 138, 139. This need not be the case. Parts of the conduit can be fabricated in an open fashion. Such fabrication may also result in simplified and less expensive molding tools.

Referring to FIG. 32, a third alternate embodiment of the present invention is shown. In this embodiment, a spool 170 is provided having a flange 172. A relief 174 is formed in the flange 172 of the spool 170 around the central opening 176. The relief 174 has a general rhombus shape with rounded corners. The central opening 176 is disposed in the center of the relief 174. Two deflectors 178, 179 are set within the relief 174. Both deflectors 178, 179 has an offset salient point 180. The offset salient point and the angles of the deflectors 178, 179 act to deflect the trimmer line 144 to the right of the salient point 180 as the trimmer line 144 approaches the salient point 180.

The relief 174, being generally shaped as a rhombus, has a long axis 182 between corners 183, 184 and a short axis 185 between corners 186, 187. Straight sections 188, 190 of the conduit lead into the relief 174 in the same line as the long axis 182. The straight sections 188, 189 of the conduit extend to open ends 192, 193 at the edge of the flange 172. These open ends 192, 193 are aligned with the eyelets 120 in the surrounding housing 112 of the trimmer head assembly when new trimmer line 144 is loaded into the trimmer head assembly.

Figure 33A:
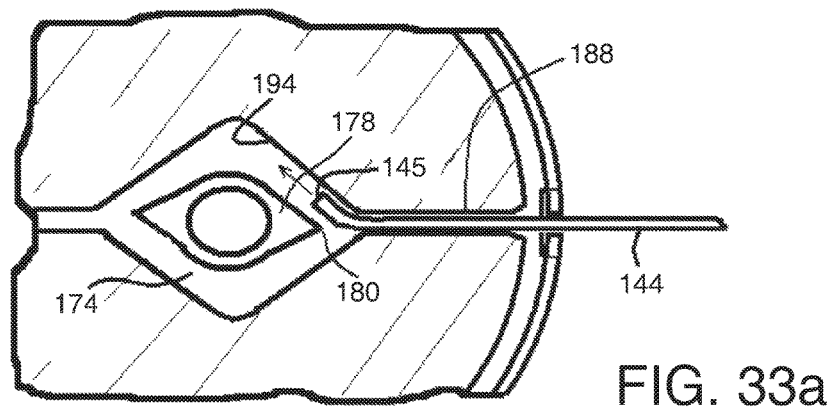
FIGS. 33a and 33b show a segment of trimmer line being advanced through the exemplary embodiment of FIG. 32.
Figure 33B:
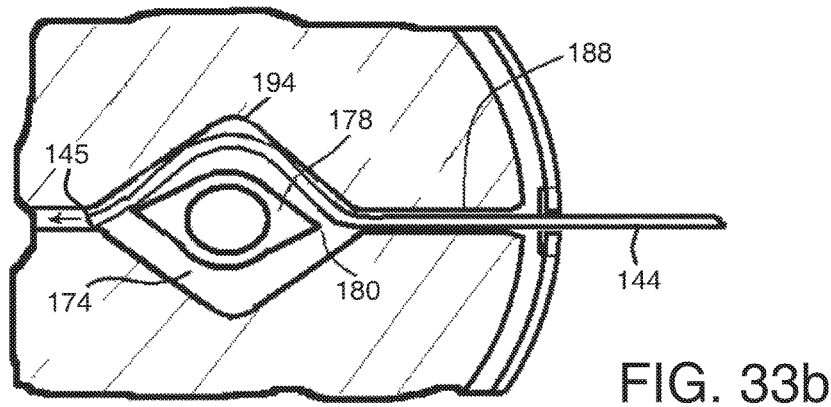

Referring to FIGS. 33a and 33b, it can be seen that when a length of trimmer line 144 is inserted through the eyelet 120 of the housing 112 and through a straight section 188 of conduit, the free end 145 of the trimmer line 144 enters the relief 174. The trimmer line 144 advances until the trimmer line 144 contacts the salient point 180 of the deflector 178. The deflector 178 deflects the trimmer line 144 to the right of the deflector 178. The trimmer line 144 then contacts the peripheral wall 194 of the relief 174 and follows the path of that wall 194. The wall 194 of the relief 174 guides the trimmer line 144 into the opposite straight section 190.

It will be understood that two deflectors 178, 179 are provided, so it does not matter in which direction the trimmer line 144 is inserted into the trimmer head. A left-to-right insertion and right-to-left insertion operate in the same manner.

As with the earlier embodiments, the combined length of the straight sections 188, 190 of the conduit are preferably longer that the distance D2 between the straight sections 188, 190 of conduit. In the shown embodiment, this distance corresponds to the long axis 182 of the relief 174.

It will be understood that the embodiments of the present invention that are illustrated and described are merely exemplary and that a person skilled in the art can make many variations to those embodiments. For instance, radius of curvatures used in the curved section of the conduit path can be varied to accommodate different spool diameters with different sized central openings. All such embodiments are intended to be included within the scope of the present invention as defined by the claims.

What is claimed is:

1. A method of loading trimmer line onto a trimmer head comprising:
   providing a spool comprising a central hub that is tubular in shape and has an inner surface and an outer surface; wherein the inner surface defines a central first opening therein; a top flange extending radially outwardly from an outer surface of the hub, a bottom flange extending radially outwardly from the outer surface of the hub; and a central flange that is located between the top flange and the bottom flange; wherein the central flange comprises a first region that extends radially outwardly from the outer surface of the hub and a second region that extends radially inwardly from the inner surface of the hub and across the central first opening; and wherein the second region defines a central second opening therein that is in communication with the central first opening and is smaller than the central first opening;
   providing a first guide opening defined in the first region of the central flange;
   providing a second guide opening defined in the first region of the central flange; wherein the second guide opening is opposed to the first guide opening;
   providing a passageway in the second region of the central flange, wherein the passageway is located inwardly of the inner surface of the hub and bypasses the central second opening and wherein the passageway is in communication with both of the first guide opening and the second guide opening and together the first guide opening, the passageway and the second guide opening form a single, continuous conduit through the intermediate flange;
   providing a housing having a first eyelet and a second eyelet formed therein, wherein said housing receives said spool therein;
   aligning the first guide opening of the spool with the first eyelet of the housing and aligning the second guide opening of the spool with the second eyelet of the housing;
   inserting a single length of trimmer line into the first eyelet of the housing;
   advancing the single length of trimmer line into the first guide opening of the spool, through the passageway and, bypassing the central second opening, through the second guide opening; and out of the second eyelet of the housing; and
   winding said trimmer line onto the outer surface of the hub of said spool and into an upper chamber of the spool defined between the central flange and the upper flange; and into a lower chamber of the spool defined between the central flange and the bottom flange.

2. The method according to claim 1, wherein said step of winding said trimmer line onto the outer surface of the hub includes providing a knob, attaching said knob to said spool and manually rotating said knob to cause said spool to rotate.

3. The method according to claim 2, wherein the step of aligning the first guide opening with the first eyelet and aligning the second guide opening with the second eyelet includes providing indicia on one of said knob and said spool and rotating said spool until said indicia is in line with both of said first and second eyelets.

4. The method according to claim 1, further comprising: affixing a knob to said spool such that the knob extends out of said housing, and wherein said knob is manually grasped and turned to rotate said spool within said housing.

5. The method according to claim 1, wherein
   upon inserting said trimmer line into said first eyelet of said housing, said trimmer line enters said passageway and is automatically guided into, and out of, said second eyelet of said housing.

6. The method according to claim 5, wherein said step of advancing the trimmer line includes advancing the trimmer line until a midpoint of said trimmer line is positioned within said housing.

7. The method as defined in claim 1, wherein the step of providing the first guide opening and the second guide opening comprises providing funnel or flare-shaped first and second guide openings; and wherein the method further comprises:
   facilitating insertion of the trimmer line into the passageway through the funnel or flare-shape of the first guide opening.

8. The method as defined in claim 1, further comprising manually rotating said spool relative to said housing to wind said trimmer line onto the outer surface of the hub of said spool.

9. The method according to claim 8, wherein said step of manually rotating said spool winds half of said trimmer line on the outer surface of the hub of said spool between said top flange and said central flange and half of said trimmer line between said bottom flange and said central flange.

* * * * *